United States Patent
DeMyer (12)

(10) Patent No.: US 12,275,659 B2
(45) Date of Patent: Apr. 15, 2025

(54) EFFECTIVE AND/OR SAFE OZONATION OF WATER IN A TANK THROUGH EVOLVED GAS CONTROL

(71) Applicant: Roving Blue, Inc., Jena, WI (US)

(72) Inventor: Marianna DeMyer, Jena, WI (US)

(73) Assignee: Roving Blue, Inc., Lena, WI (US)

( * ) Notice: Subject to any disclaimer, the term of this patent is extended or adjusted under 35 U.S.C. 154(b) by 487 days.

(21) Appl. No.: 17/101,663

(22) Filed: Nov. 23, 2020

(65) Prior Publication Data

US 2022/0041476 A1 Feb. 10, 2022

Related U.S. Application Data

(60) Provisional application No. 63/063,885, filed on Aug. 10, 2020.

(51) Int. Cl.
*C02F 1/461* (2023.01)
*C02F 1/467* (2023.01)

(52) U.S. Cl.
CPC ........ *C02F 1/4672* (2013.01); *C02F 1/46109* (2013.01); *C02F 2001/46142* (2013.01); *C02F 2001/46147* (2013.01); *C02F 2201/4611* (2013.01); *C02F 2201/46115* (2013.01); *C02F 2201/4614* (2013.01); *C02F 2201/46145* (2013.01); *C02F 2201/4615* (2013.01); *C02F 2201/4618* (2013.01); *C02F 2201/782* (2013.01); *C02F 2201/784* (2013.01); *C02F 2303/04* (2013.01)

(58) Field of Classification Search
CPC ................ C02F 1/46109; C02F 1/4672; C02F 2001/46142; C02F 2001/46147; C02F 2201/4611; C02F 2201/46115; C02F 2201/4614; C02F 2201/46145; C02F 2201/4615; C02F 2201/4618; C02F 2201/782; C02F 2201/784; C02F 2209/006; C02F 2303/04
See application file for complete search history.

(56) References Cited

U.S. PATENT DOCUMENTS 8,911,793 B1 * 12/2014 Loucaides .............. A61K 33/38
424/618
2002/0092775 A1 * 7/2002 Andrews .................. C25B 9/23
204/252

* cited by examiner

*Primary Examiner* — Benjamin L Lebron
(74) *Attorney, Agent, or Firm* — Peter Jensen-Haxel

(57) ABSTRACT

Disclosed are a method, a device, and/or system of effective and/or safe ozonation of water in a tank through evolved gas control. In one embodiment, a system for effective ozonation of water includes an ozone generator for producing ozone partially in the form of ozone gas, and a disperser. The disperser is configured to receive ozone gas from the ozone generator rising through the water as ozone bubbles disperse the ozone bubbles within the water. The disperser increases a contact time of the ozone and/or distributes dissolution of the ozone in the water. The disperser may include one or more bubble paths guiding the ozone bubbles. The ozone generator may be an electrolytic ozone unit. An electrode may include a proton exchange membrane electrically coupling an anode and a cathode of an electrode, where hydrogen gas generated at the cathode may be vented and/or conveyed to a catalytic decomposition unit.

7 Claims, 16 Drawing Sheets

FIG. 1  Ozonation Apparatus 100

Ozonation Apparatus 200

Dispersion Cone 300

FIG. 4  Ozonation Apparatus 400

FIG. 5  Control System 550

*FIG. 6*  Treatment Program Process Flow 650

FIG. 7    Volume Change Treatment Program Adjustment Process Flow 750

Angle Treatment Program
Adjustment Process Flow 850

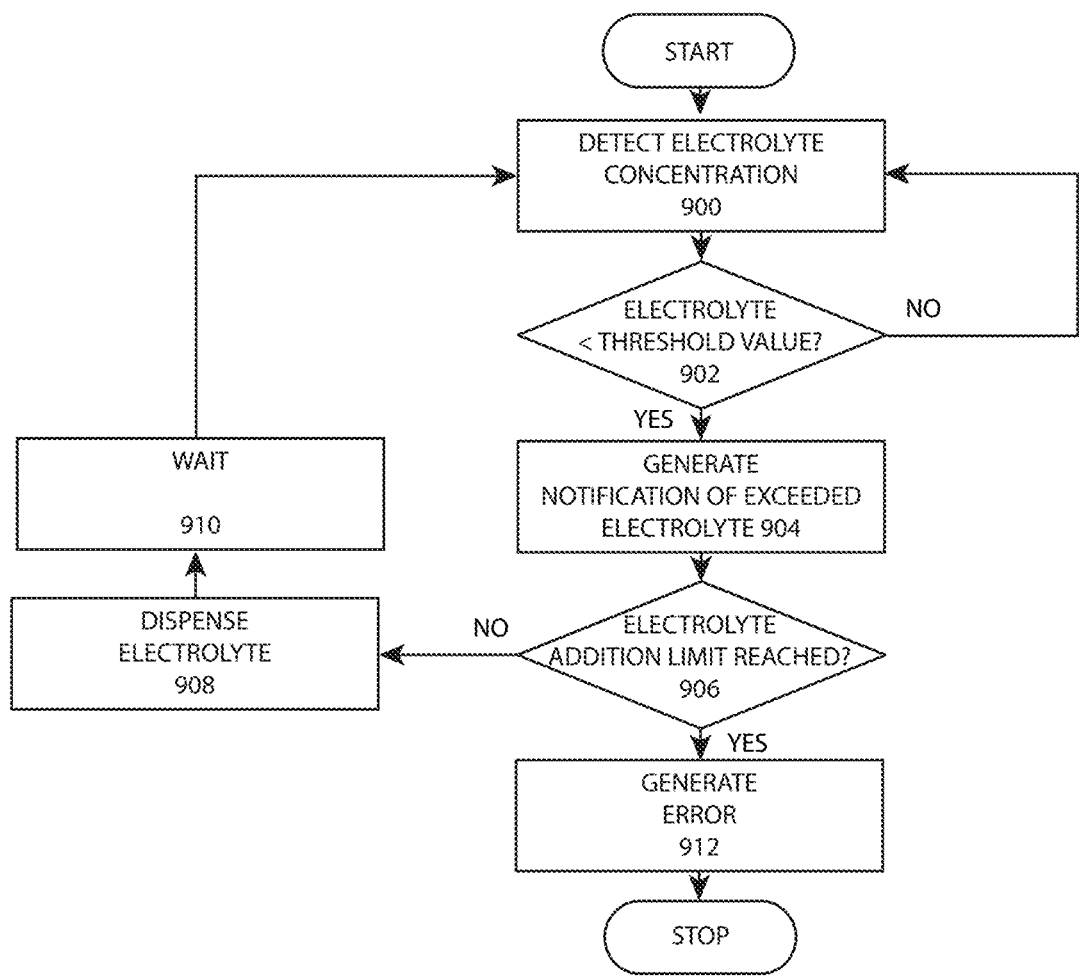
FIG. 9  Electrolyte Treatment Program Adjustment Process Flow 950

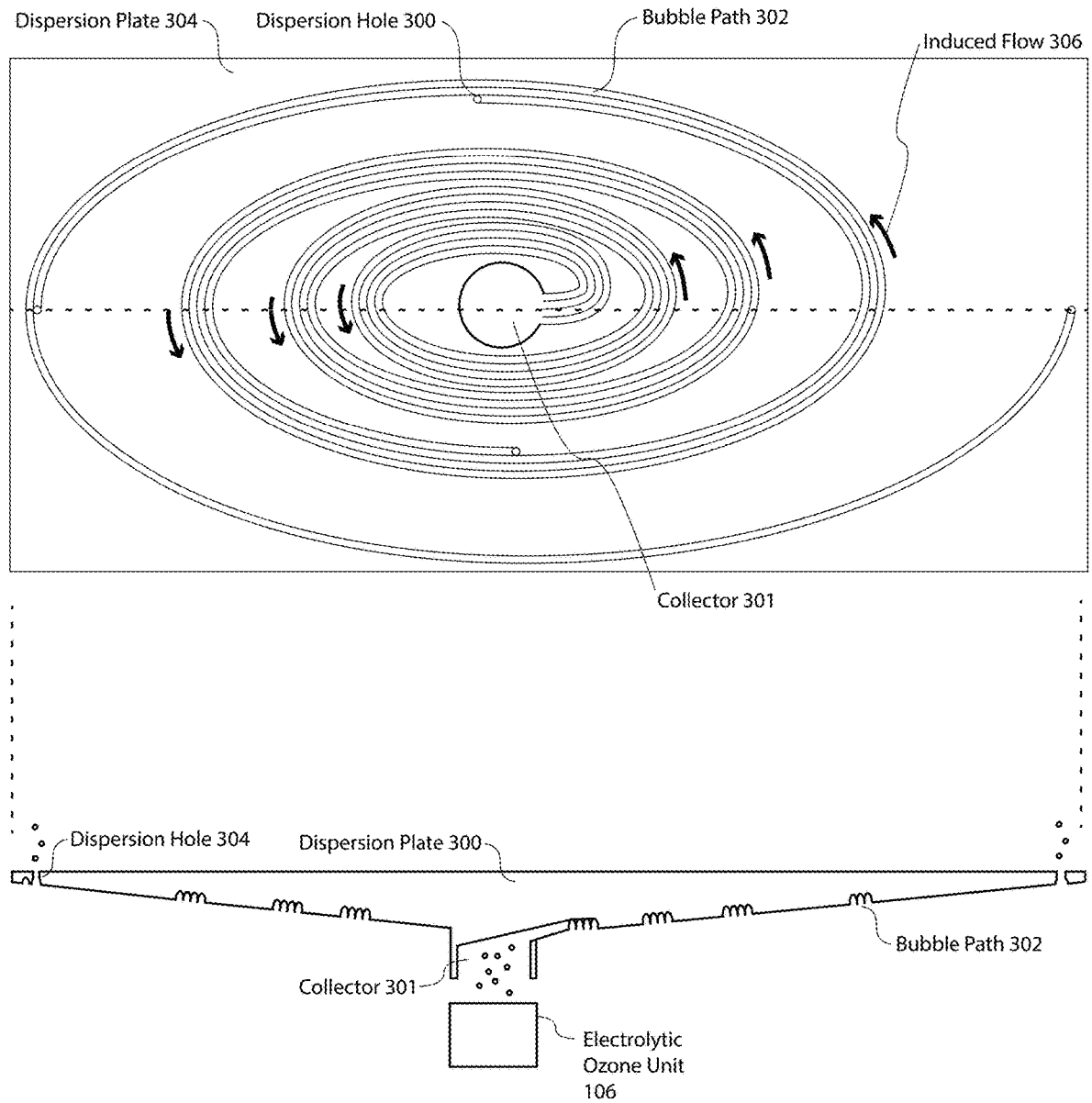
*FIG. 10*  Dispersion Plate 1000

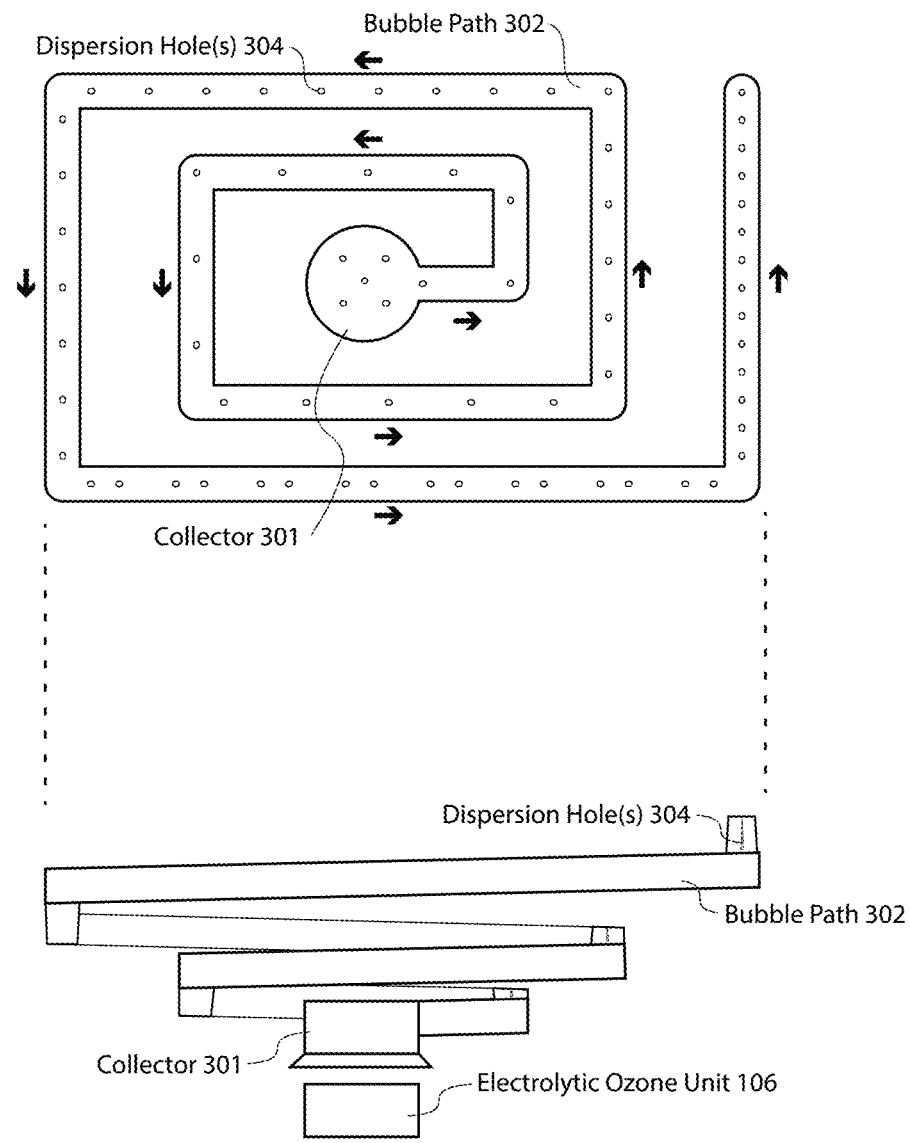
FIG. 11  Dispersion Tube 1100

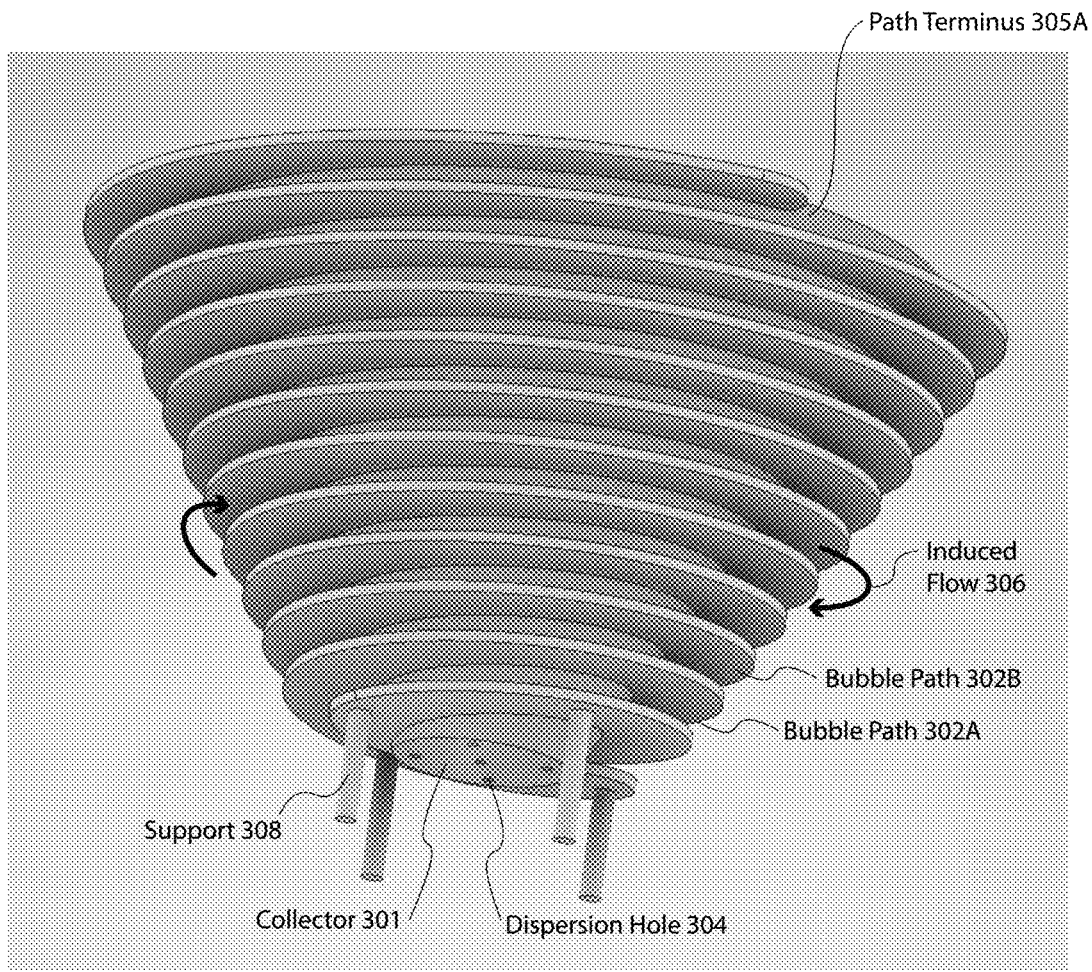
FIG. 12A  Dispersion Cone 1200

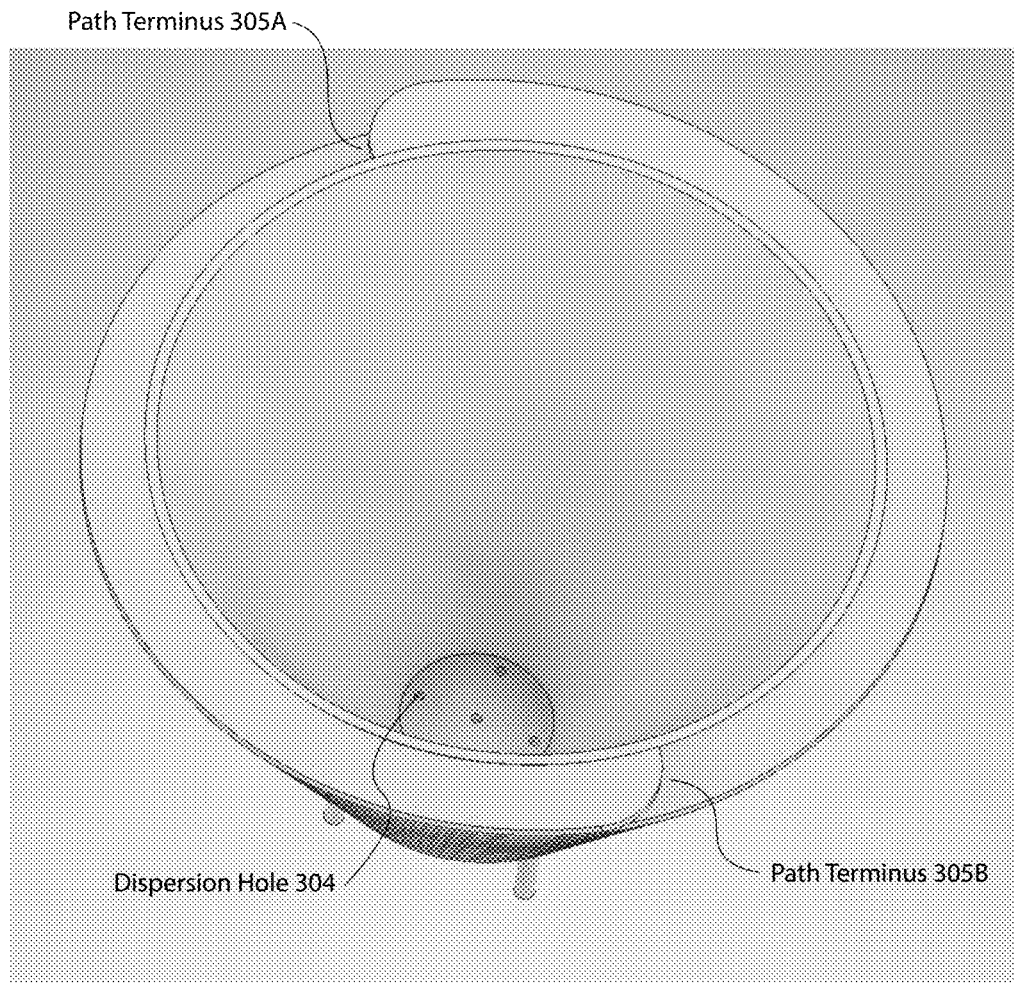
FIG. 12B  Dispersion Cone 1200

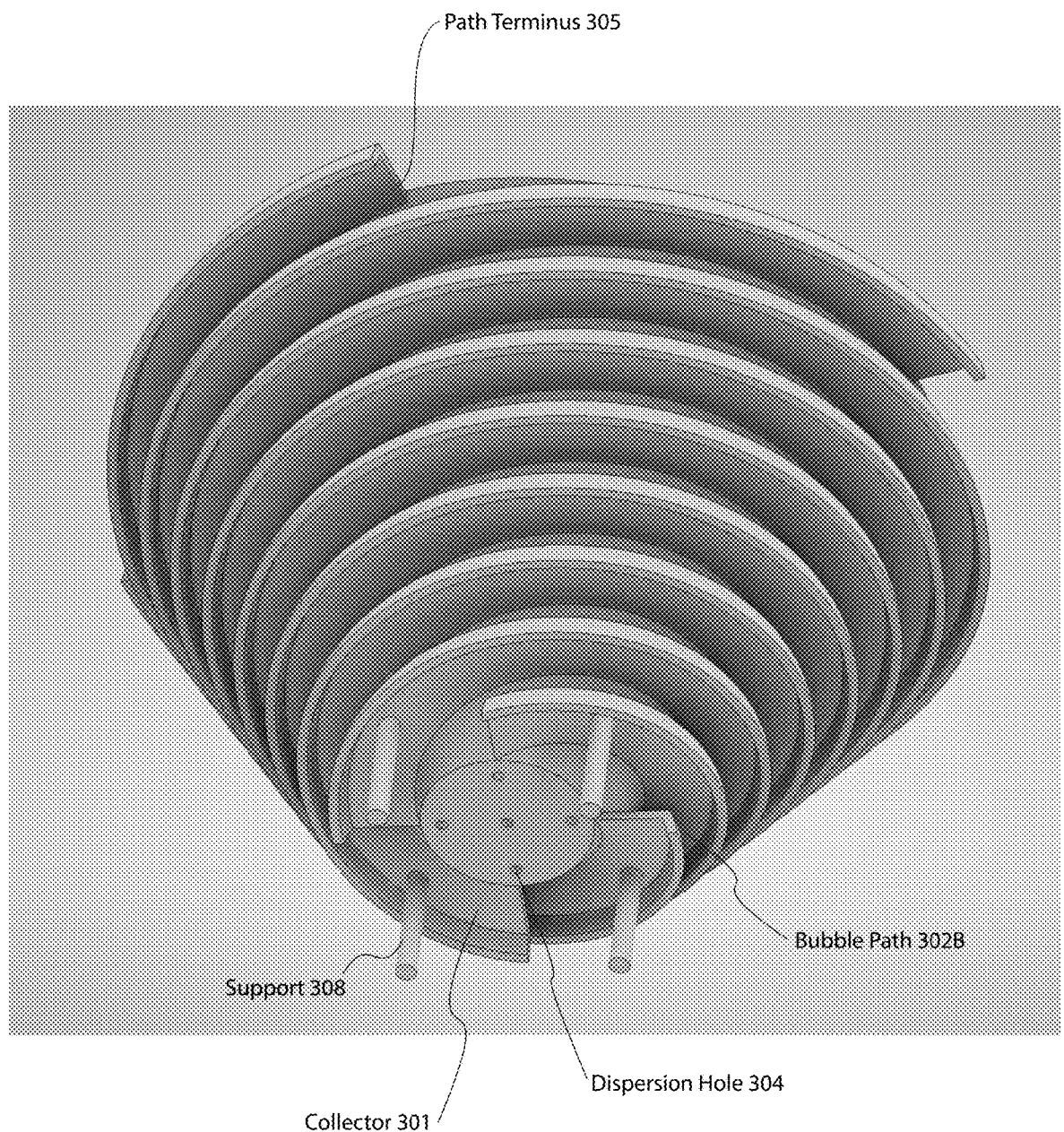
FIG. 13A  Dispersion Cone 1300

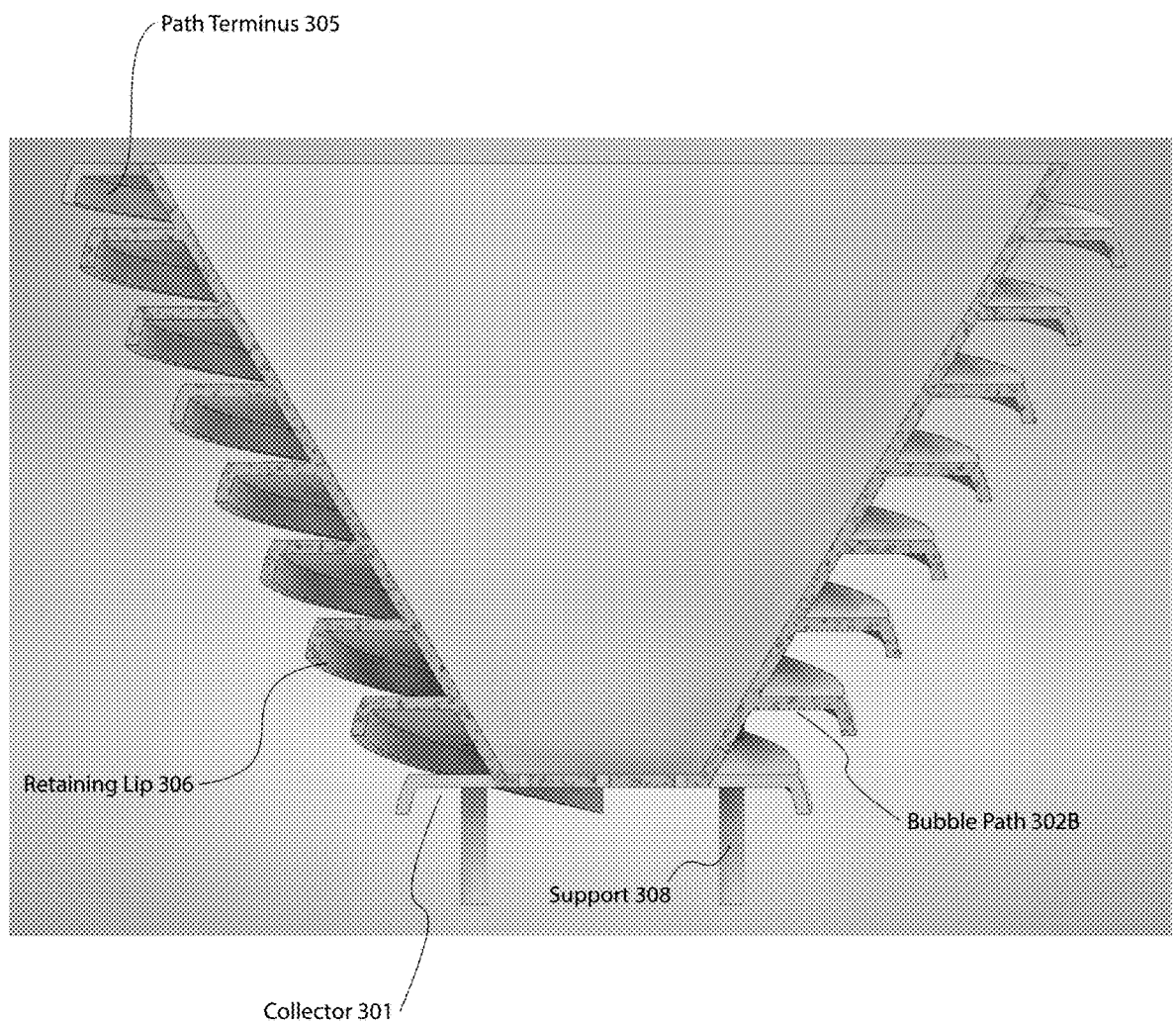
FIG. 13B  Dispersion Cone 1300

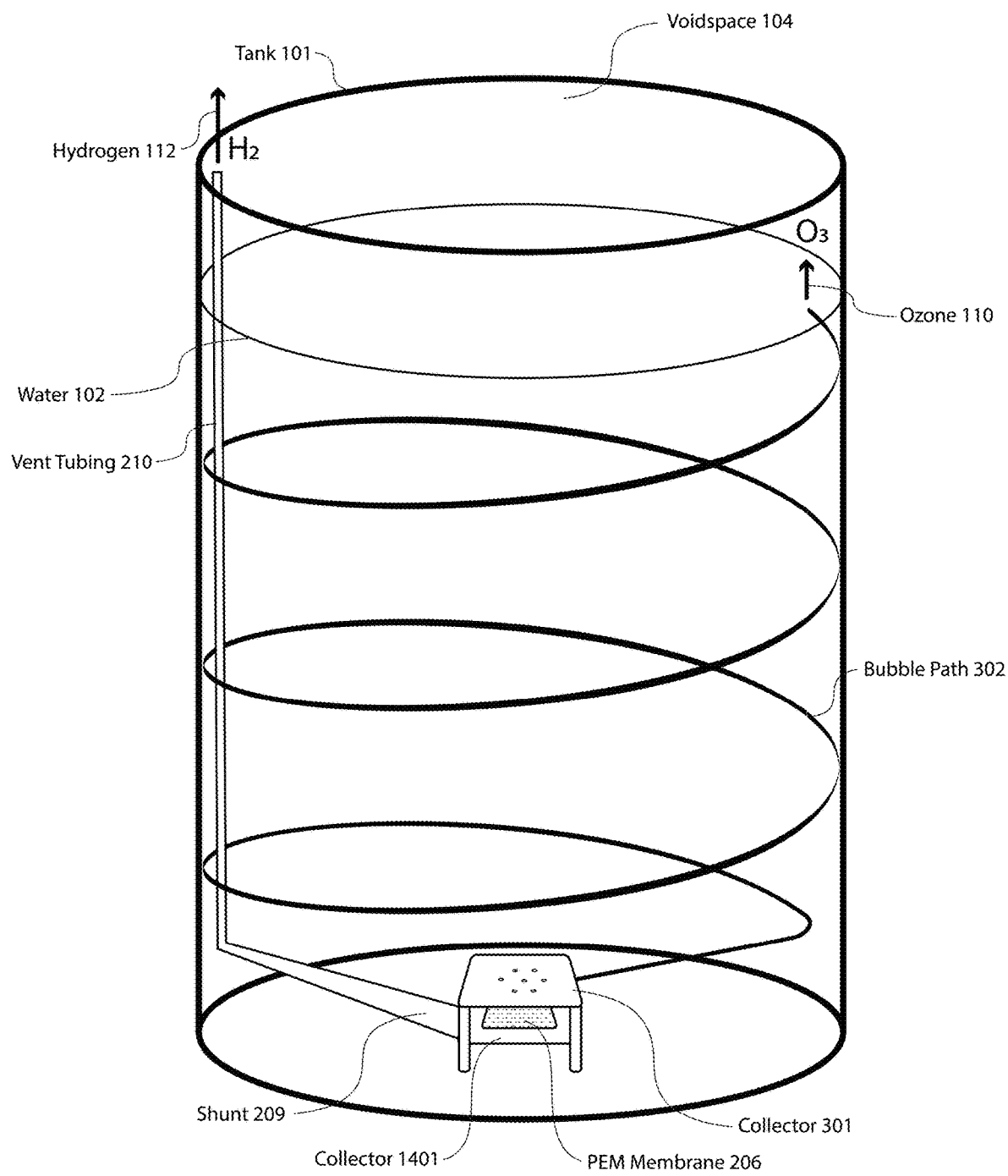
*FIG. 14*  Ozonation Apparatus 1400

EFFECTIVE AND/OR SAFE OZONATION OF WATER IN A TANK THROUGH EVOLVED GAS CONTROL

CLAIM FOR PRIORITY

This patent application claims priority from, and hereby incorporates by reference: U.S. provisional patent application No. 63/063,885, entitled 'EFFECTIVE AND/OR SAFE ELECTROLYTIC OZONATION OF WATER IN A TANK THROUGH ELECTROLYTIC GAS CONTROL', filed Aug. 10, 2020.

FIELD OF TECHNOLOGY

This disclosure relates generally to water treatment and ozone generation and, more particularly, effective and/or safe ozonation of water in a tank through evolved gas control.

BACKGROUND

Water is often treated in and/or stored for later utilization inside a tank. Water tanks may be widely used from small home use, to mobile systems such as in recreational vehicles or trailer-based water tanks, to large municipal water systems. Water treatment and storage systems utilizing a tank may be also useful in remote areas such as wilderness, in places that lack adequate infrastructure such as developing nations, and during emergencies such as natural disasters. For example, on-site production of clean water production may be important for workers with remote field work, villagers in developing nations, and organizations such as the Federal Emergency Management Administration (FEMA), the United States military, or non-profit humanitarian organizations.

Treatment and/or maintenance of clean water in a tank can pose a number of challenges. For example, the tank may need to be closed such that debris or contaminants do not get in to the water, or the water does not slosh out during movement, yet may also need to be treated such that pathogens or other contaminates are removed and/or maintained so that mold, bacteria, or other organisms do not grow inside the tank.

One strategy for water treatment and/or maintenance is the use of in-situ ozone production. Ozone is a powerful oxidant with many applications across many industries. For example, ozone is utilized as an antiseptic, disinfectant, water treatment, cleaning agent, commercial bleaching agent, and chemical reagent. Advantages of ozone for water treatment may include its strong oxidizing capability, relatively short lifespan, its inability to turn into halogenated carbon compounds, and similarly its decomposition into non-toxic diatomic oxygen gas. Ozonated water can also be used for many purposes such as wound disinfection (e.g., to treat an injury or for a mobile hospital) and as a general cleaning agent.

However, use of ozone can also pose challenges. For example, ozone may not be inherently soluble in water, and may tend to rise as small gas bubbles where the ozone may escape the water being treated, decreasing the dissolved ozone concentration and therefore treatment effectiveness. Ozone concentration can also be difficult to sense in small treatment devices and systems. For example, it may be difficult for a user to know, for a given body of water to be treated, how long an ozone generator should run and/or how long to let the water "rest" for effective and/or safe treatment. At the same time, overproduction of ozone is not efficient. Inefficient use may reduce the number of uses in the field where a battery is utilized, and/or reduce the lifespan of the ozone generator.

One method for generation of ozone is electrolytic ozone production utilizing an electrode. While electrolytic ozone generation may have some advantages, it may produce as a byproduct hydrogen gas or other byproduct chemicals during electrolytes of the water being treated. In some environments, hydrogen gas may be flammable or the other byproduct chemicals may be hazardous and/or unwanted. This may be a concern with a water treatment and/or maintenance system including a tank in which the gas could build up.

Water treatment devices, systems, and methods are important technology without which people may not have access to safe or effective water. While ozone provides an advantageous approach to water treatment, new and improved methods of water treatment and/or maintenance are desirable to further improve its reliability, usability, and effectiveness.

SUMMARY

Disclosed are a method, a device, and/or system of effective and/or safe ozonation of water in a tank through evolved gas control. In one embodiment, a system for effective ozonation of water includes an ozone generator for producing an ozone at least partially in the form of ozone gas and a disperser. The disperser is configured to receive ozone gas from the ozone generator rising through the water as ozone bubbles and, when the disperser is at least partially submerged in the water, disperse the ozone bubbles within the water. The disperser increases a contact time of the ozone and/or distributes dissolution of the ozone in the water.

The ozone generator may be an electrolytic ozone unit. The electrolytic ozone unit may include an electrode having an anode and a cathode, the cathode producing the ozone when the anode and the cathode are electrically coupled through the water. The disperser may include a bubble path guiding the ozone bubbles to increase the contact time of the ozone and/or distribute the ozone dissolution of the ozone in the water. The disperser may also include a collector for catching the ozone bubbles rising from the electrode and conveying at least a portion of the ozone bubbles to the bubble path. The bubble path may increase in slope to facilitate passive transport of the ozone bubbles along the bubble path, and the bubble path may transport the ozone horizontally from the electrode.

The electrode may include a proton exchange membrane electrically coupling the anode and the cathode and segregating production of the ozone at the anode and a hydrogen gas at the cathode. The system may further include a tubing and a shunt conveying the hydrogen gas from the cathode of the electrode to the tubing. The system may also include a catalytic decomposition unit configured to receive the hydrogen gas from the tubing. The catalytic decomposition unit may include a decomposition catalyst that decomposes the hydrogen gas.

The system includes a power source electrically coupled to the electrode and a control unit communicatively coupled to the electrode configured to inhibit flow of power from the power source to the electrode when an angle of the disperser exceeds a threshold value. The anode of the electrode may include boron doped diamond and/or tin-nickel oxide. The decomposition catalyst may include platinum, and the catalytic decomposition unit may further include an air intake for receiving an air containing oxygen for catalytic conversion of hydrogen to water in the presence of the platinum. The disperser may include at least one support for positioning the collector over the electrode. The bubble path may retain the ozone bubbles within the bubble path when the angle of the disperser is up to and including fifteen degrees. The bubble path may retain the ozone bubbles within the bubble path when the angle of the disperser is up to and including fifteen degrees through a retaining lip and/or a closed channel.

In another embodiment, a method for treating water in a tank with ozone includes receiving an activation instruction to treat the water in the tank, determining a volume of the water in the tank, and determining a treatment duration for the water with the ozone based on the volume of the water in the tank. The method sets a timer for generation of the ozone gas by an electrolytic ozone unit and initiates generation of dissolved ozone and ozone gas at least partially in the form of ozone bubbles utilizing the electrolytic ozone unit that includes an electrode having an anode producing the ozone and a cathode. The method inhibits the vertical rise velocity of the ozone bubbles to increase an ozone concentration per unit of power of a power source. The method also deflects ozone bubbles rising from the electrolytic ozone unit horizontally to increase the ozone concentration per unit of power of the power source.

The method may detect an angle of the tank and/or a disperser inhibiting the vertical rise velocity of the ozone bubbles and/or deflecting the ozone bubbles rising from the electrolytic ozone unit horizontally. The method may determine the angle of the tank and/or the disperser exceeds a threshold value and generate a notification that the angle of the tank and/or the disperser exceeds the threshold value. The method may also deactivate the electrode by preventing a supply of the power from the power source to the electrode when determining the angle of tank and/or the disperser exceeds the threshold value.

The method may also determine an inflow of a new water into the tank. A new volume of the water in the tank may be calculated following the inflow of the new water into the tank. The treatment duration may be recalculated based on the inflow of the new water into the tank. A remaining time of the timer may be extended to ensure effective treatment of the water.

The method may determine an outflow of the water from the tank and calculate a new volume of the water in the tank following the outflow of the water from the tank. The duration may be re-calculated based on the outflow of the water from the tank. A remaining time of the timer may be shortened to ensure effective treatment of the water.

The ozone bubbles may be channeled along one or more bubble paths rising in slope to increase contact time with the water. The ozone bubbles may be released to rise in the water from the one or more bubble paths at one or more dispersion holes.

An electrical current may be applied across a proton exchange membrane electrically coupling the anode and the cathode, the proton exchange membrane segregating production of the ozone at the anode and a hydrogen gas at the cathode. The hydrogen gas from the cathode of the electrode may be shunted to a catalytic decomposition unit comprising a decomposition catalyst. The hydrogen gas may then be catalytically decomposed.

The method may determine a trigger event. The activation instruction may then be generated to treat the water in the tank. An electrolyte concentration in the water may be determined. The electrolyte concentration may be determined through detection of a conductivity of the water. It may then be determined that the electrolyte concentration is below a second threshold value. The electrode may be deactivated by preventing a supply of power from the power source to the electrode when determining the determining the electrolyte concentration in the water is below the second threshold value. The method may generate a notification that the electrolyte concentration is below the second threshold value. An electrolyte may be dispensed into the water.

The volume of the water in the tank may be determined through measurement of a depth of the water in the tank and/or a weight of the water in the tank. The anode of the electrode may include boron doped diamond and/or tin-nickel oxide. The decomposition catalyst can include platinum.

In yet another embodiment, an apparatus for treating water includes a tank, an electrolytic ozone unit, and a disperser. The tank holds the water and includes an opening of the tank for inputting untreated water into the tank and/or outputting treated water from the tank. The electrolytic ozone unit includes an electrode having an anode for producing at least one of dissolved ozone and/or ozone gas and includes a cathode. The disperser is configured to receive ozone gas from the electrode rising through the water when the disperser is at least partially submerged in the water and to disperse the ozone bubbles within the water to increase a contact time of the ozone and distribute dissolution of the ozone in the water.

The disperser may include a bubble path of the disperser guiding the ozone gas to increase the contact time of the ozone and distribute ozone in the water. The bubble path may increase in slope to facilitate passive transport of the ozone gas along the bubble path, and the bubble path may transport the ozone gas horizontally from the electrode. A collector of the disperser may catch the ozone bubbles rising from the electrode and convey at least a portion of the ozone gas to the bubble path.

The apparatus may further include a control unit communicatively coupled to the electrode, the control unit including computer readable instructions that when executed: (i) detect a depth of the water in the tank; (ii) calculate a volume of the water in the tank based on the depth; (iii) determine a treatment duration of the water with the ozone; (iv) set a timer for generation of the ozone gas by the electrode; and (v) supply power to the electrode.

The control unit may further include computer readable instructions that when executed: (i) detect an angle of tank and/or the disperser; (ii) determine the angle of the tank and/or the disperser exceeds a threshold value; and (iii) deactivate the electrode by preventing the supply of a power from a power source to the electrode when determining the angle of tank and/or the disperser exceeds the threshold value. In addition, the control unit may further include computer readable instructions that when executed: (i) determine a trigger event; (ii) generate an activation instruction to generate the ozone with the electrolytic ozone unit; (iii) determine an electrolyte concentration in the water, where the electrolyte concentration determined through detection of a conductivity of the water; (iv) generate a notification that the electrolyte concentration is below a second threshold value; (v) deactivate the electrode by preventing a supply of power from the power source to the electrode when determining the electrolyte concentration is below the second threshold value; and (vi) generate a dispensing instruction to dispense an electrolyte into the water.

The apparatus may include at least one vent in a wall of the tank venting the ozone gas and/or hydrogen produced by the electrode. One or more fans may also be included in the apparatus to move an outside air into a voidspace of the tank and/or move air inside the voidspace (including the ozone gas and/or the hydrogen) out of the tank. The apparatus may also include a catalytic decomposition unit configured to receive hydrogen gas from the electrolytic ozone unit, the catalytic decomposition unit including a decomposition catalyst that decomposes the hydrogen gas. The decomposition catalyst may include platinum. The catalytic decomposition unit may further include an air intake for receiving an air outside the tank containing oxygen for catalytic conversion of the hydrogen to water in the presence of the platinum. The anode of the electrode may include boron doped diamond and/or tin-nickel oxide.

BRIEF DESCRIPTION OF THE DRAWINGS

The present embodiments are illustrated by way of example and not limitation in the figures of the accompanying text, in which like references indicate similar elements and in which:

FIG. 9 illustrates an electrolyte treatment program adjustment process flow, according to one or more embodiments;

FIG. 10 illustrates another example of the disperser of FIG. 1, including a collector that may be positioned above the electrolytic ozone unit, a dispersion plate with a set of spiral bubble paths in a spiral pattern for circulating bubbles of ozone, the bubble paths sloping upward within the dispersion plate such that bubbles travel along the bubble path and possibly create an induced flow, each bubble path terminating in a dispersion hole releasing undissolved ozone as bubbles into various regions of the tank, according to one or more embodiments;

FIG. 11 illustrates yet another example of the disperser comprising continuous dispersion holes along a bubble path defined by a tubing (e.g., a closed channel), according to one or more embodiments;

FIG. 12A illustrates yet another example of the disperser comprising a bubble path that may slow vertical rise, convey bubbles horizontally, and/or create an induced flow to assist in generating dissolved ozone to treat the water, according to one or more embodiments;

FIG. 12B is a second view of the embodiment of FIG. 12B, the second view further illustrating two instances of a path terminus where bubbles may leave the disperser of FIG. 1, according to one or more embodiments;

FIG. 13A is another example of the disperser, according to one or more embodiments;

FIG. 13B is a second view of the embodiment of FIG. 13A shown in a cross section, according to one or more embodiments; and FIG. 14 illustrates an instance of the ozonation apparatus that may be additively manufactured (e.g., three-dimensionally printed), for example including one or more integrated components within the tank such as the bubble path for the ozone and the vent tubing for hydrogen gas, according to one or more embodiments.

Other features of the present embodiments will be apparent from the accompanying drawings and from the detailed description that follows.

DETAILED DESCRIPTION

Disclosed are a method, a device, and/or system of effective and/or safe ozonation of water in a tank through evolved gas control. Although the present embodiments have been described with reference to specific example embodiments, it will be evident that various modifications and changes may be made to these embodiments without departing from the broader spirit and scope of the various embodiments.

The present embodiments may be utilized to treat water such that it is safe for drinking, usable as a means of sterilization (e.g., as an oxidizing cleaner or antiseptic), for chemical treatment (e.g., breakdown of organic chemicals), usable as a chemical reagent, and for other purposes. One of the challenges that may be addressed in one or more of the present embodiments is the dispersion of ozone within a tank such that ozone dissolution in water increases. Another challenge that may be addressed with one or more of the present embodiments is management of hydrogen gas such that it is effectively dispersed and/or decomposed that may, for example, reduce the risk of fire or explosion. Yet another challenge that may be addressed with one or more of the present embodiments is management of ozone gas such that it is effectively dispersed and/or decomposed such that it may, for example, reduce ozone exposure to humans or equipment sensitive to oxidation. Another challenge that may be addressed with one or more of the present embodiments is use of electrolytic ozone in a sealed, substantially sealed, and/or intermittently sealed container, tank, and/or vessel.

Figure 1:
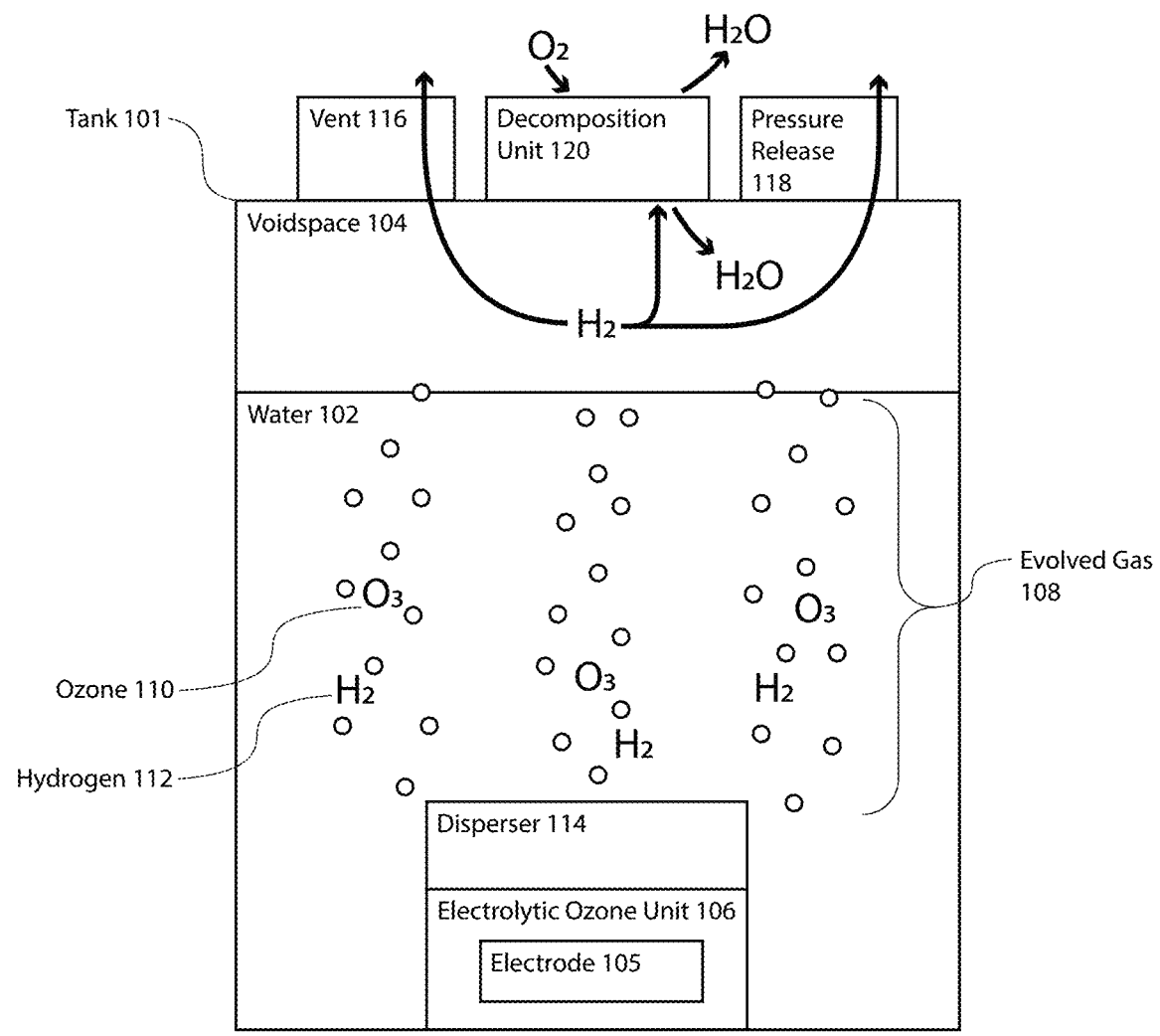
FIG. 1 illustrates an ozonation apparatus treating water with ozone generated using an ozone generator such as an electrolytic ozone unit generating evolved gasses of ozone (e.g., ozone gas) and hydrogen (e.g., hydrogen gas) that may be distributed through water in the tank utilizing a disperser, where the hydrogen may be vented from the tank, decomposed, and/or released under pressure, according to one or more embodiments.

FIG. 1 illustrates an ozonation apparatus 100 treating water 102 with ozone 110 generated on an electrolytic ozone unit 106 including generating evolved gas 108 of ozone (e.g., the ozone 110 in a bubble form) and hydrogen 112 (e.g., diatomic hydrogen in a bubble form) that may be distributed with a disperser 114, where the hydrogen 112 may be vented (e.g., by the vent 116), decomposed (e.g., by the decomposition unit 120), and/or released under pressure (e.g., by the pressure release 118), according to one or more embodiments.

The tank 101 may be made of a material suitable for holding water as may be known in the art, for example made of steel, plastic, or other suitable materials. In one or more embodiments, the tank 101 may be a material that is corrosion resistant under an oxidizing environment as may be exist in the presence of ozone (e.g., an oxidation resistant material such as stainless steel, certain plastics, certain ceramics or composites, etc.). Although shown with a rectangular cross section for illustrative purposes, the tank 101 may be any shape such as a box, a cylinder, or a sphere. For example, the tank 101 may be a thirty, forty, or seventy-gallon tank commonly used in motor homes and recreational vehicles. In another example, the tank 101 may be a 500 gallon portable water tank carried on a trailer. In yet another example, the tank 101 may be a cylindrical 50,000 gallon water tower. The volume inside the tank may comprise water 102 and a voidspace 104 filled with one or more gasses such as air.

An electrolytic ozone unit 106 may be an ozone generator comprising an assembly of one or more components for electrolytic production of ozone 110 in water (e.g., the water 102). The electrolytic ozone unit 106 includes an electrode 105 that produces ozone when an electric current is run through the electrode 105 while the electrode 105 is exposed to water. In one or more embodiments the electrode 105 is a tin-nickel antimony electrode as may be known in the art. See Wang, et al (J. Electrochem. Soc., Volume 152(11), pp D197-D200 (2005). In one or more embodiments, other electrodes may be utilized including electrodes based on platinum, lead oxide, and/or boron doped diamond. As shown and described in conjunction with the embodiment of FIG. 2, ozone 110 may be produced at an anode of the electrode 105 (e.g., the anode 207) and hydrogen may be produced at a cathode of the electrode 105 (e.g., the cathode 208). Additional components of the electrolytic ozone unit 106 may include leads connecting each of the anode and the cathode to a power source (e.g., a power source 508 of FIG. 5), and optionally a proton exchange membrane (e.g., the PEM membrane 206) permitting electron flow between the anode and cathode while limiting gas and/or water exchange between two sides and/or poles of the electrode (e.g., the electrode 205), as shown and described in conjunction with the embodiment of FIG. 2.

The electrolytic ozone unit 106 produces ozone 110, part of which may be dissolved and part of which may be produced as bubbles. The bubbles may be microbubbles, which may be visible to the naked eye as small clouds or regions of cloudiness in the water 102. Ozone 110 that is aqueous (which may be referred to as "dissolved ozone") may be primarily useful for treatment of water. Movement of bubbles through the water 102 may be further produce dissolved ozone and/or increase dissolved ozone concentration. Hydrogen 112 may also be produced in dissolved form and/or bubble form. Both bubbles of the ozone 110 and/or the hydrogen 112 will generally float upward as the evolved gas 108, for example to the top of the tank 101 where they may enter (and/or expand) the voidspace 104.

Figure 3:
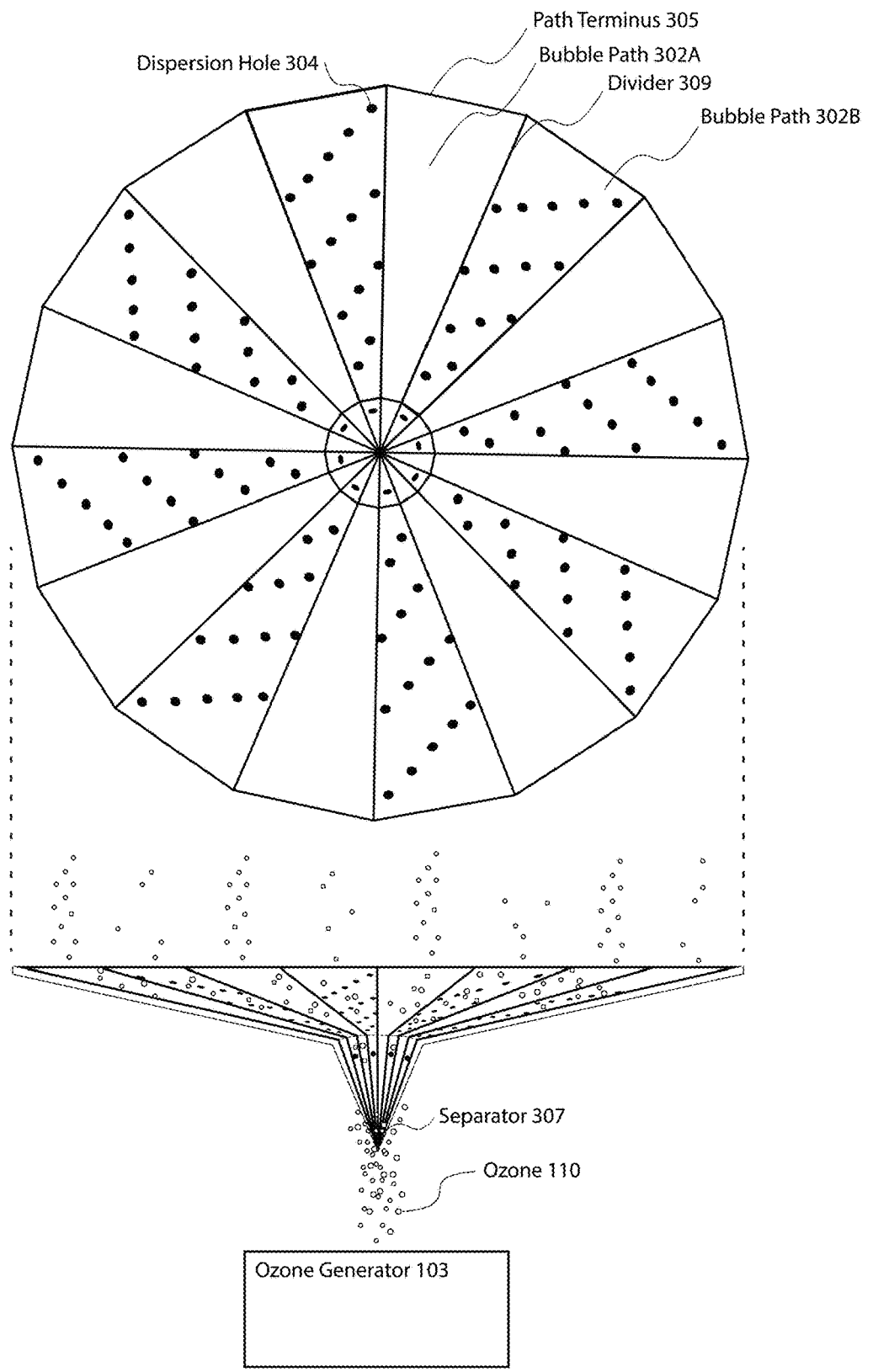
FIG. 3 illustrates an example of the disperser of FIG. 1, including a dispersion cone that may be positioned above the ozone generator, including a set of bubble paths for slowing the vertical rise of ozone gas and/or deflecting the ozone gas horizontally from the ozone generator, a set of the bubble paths including one or more dispersion holes releasing undissolved ozone as bubbles into various regions of the tank, according to one or more embodiments.

It should be noted that in one or more embodiments, a different type of ozone generator than an electrolytic ozone generator may be used. In general, a device, apparatus, and/or system generating ozone may be referred to herein as the ozone generator 103 (e.g., as shown in the embodiment of FIG. 3). For example, the ozone generator 103 may be also based on coronal discharge ozonation in which a high voltage electric current is arced through oxygen containing air. As used herein, the ozone generator 103 may be based on coronal discharge, electrolytic ozone production, and/or other methods.

The disperser 114 is a device, system, and/or product that distributes the evolved gas 108 generated by the electrolytic ozone unit 106, including optionally generating an induced flow 306 as shown and described in the embodiment of FIG. 10 and FIG. 12A. In one or more embodiments, the disperser 114 may be a mechanical fan, paddle, or blade that stirs the water 102. In one or more embodiments, and as shown in the embodiments of FIG. 10, FIG. 11, FIG. 12A, and FIG. 12B, the disperser 114 may comprise a bubble path channeling the evolved gas 108 that may increase contact time, induce circular flow of the water 102 in the tank 101, and/or channel the evolved gas 108 to various locations in the water 102 of the tank 101. In one or more embodiments, and including the embodiment of FIG. 1, three columns of bubbles are shown illustrating dispersion of the evolved gas 108 through the water 102. The operation of the electrolytic ozone unit 106 and treatment of the water may be initiated manually (e.g., by a user activating an 'on switch' which may then optionally run on a timer) and/or may be activated according to scheduled and/or calculated parameters by a control unit 500 (e.g., through generation of an activation instruction) as shown and described in the embodiment of FIG. 5.

During and/or following treatment of the water 102, the voidspace 104 may begin to fill and/or expand with the evolved gas 108, including the ozone 110 and/or the hydrogen 112. In certain situations the production and buildup of hydrogen 112 and/or ozone 110 may be dangerous, which may depend on tank size, tank material, intended use of the water, placement location or a local environment of the tank 101, etc. In the case of a tank mounted in or on a motorized vehicle, that tank 101 may generally be in the presence of sparks or other ignition sources. In such case, buildup of hydrogen gas may be dangerous or pose a hazard. Similarly, when in the presence of one another, ozone 110 and hydrogen 112 may be reactive, as the ozone 110 is a strong oxidizing agent and the hydrogen 112 is a strong reducing agent.

In one or more embodiments, the vent 116 may permit the evolution of hydrogen 112 (e.g., as diatomic hydrogen gas) and/or the evolution of ozone 110 (as ozone gas). The vent 116 may double as an air intake to relieve low pressure and/or vacuum pressure created in the voidspace 104 when water 102 is removed from the tank 101.

Alternatively, or in addition, hydrogen 112 may be vented and/or directed through a decomposition unit 120. The decomposition unit 120 comprises one or more components that catalyze the decomposition of hydrogen 112 (e.g., diatomic hydrogen gas). In one or more embodiments, the decomposition unit 120 utilizes a decomposition catalyst (e.g., decomposition catalyst 401) that is platinum, which may be configured as a catalyst screen 402 with relatively high surface area which the hydrogen gas passes over. The catalyst screen 402 may convert the hydrogen 112 to water 102 in the presence of oxygen gas (e.g., diatomic oxygen). In one or more embodiments, the tank 101 may be sealed except that the evolved gas 108 may be directed through the decomposition unit 120. In one or more embodiments, the pressure release 118 may, upon exposure to a certain threshold of positive or negative pressure inside the tank 101 relative to an outside environment, release and/or bleed excess gas in the voidspace 104.

In one or more embodiments, an electrolyte may be added to improve conductivity of the water 102 to assist in generation of the ozone 110. For example, sodium chloride, potassium chloride, citric acid, acetic acids, other organic acids, and/or other suitable ionic solutions or compounds may be utilized. The electrolyte may be added in tablet form, in a time-release capsule, in a powder form, in a concentrated solution, and/or according to other methods as may be known in the art. The electrolyte may be manually added (e.g., through an opening in the tank 101 upon filling), may be incorporated into an inflow (e.g., entering through the water inlet 201), and/or may be added by an automatic dispenser (e.g., set in the roof of the tank 101). If automatically dispensed from an electrolyte dispenser, the electrolyte dispenser may be controlled by the control unit 500 and coordinated with inflow of the water 102 and/or the filling of the tank 101. One or more conductivity sensors may also be used to measure and appropriately adjust the conductivity of the water 102 (e.g., the conductivity sensor 520). However, it should be noted that in one or more embodiments, the PEM membrane 206 may create sufficient conductivity for use in substantially non-conductive or low-conductivity water 102, including instances of the water 102 that are deionized, distilled, and/or purified, including through distillation and/or reverse osmosis. In one or more embodiments, any gases within the evolved gas 108 resulting from addition of the electrolyte (e.g., chlorine gas that may result from electrolysis of sodium chloride) can also be managed through vending by the vent 116 and/or the a different decomposition unit 120.

In one or more embodiments, the electrode 205 may become "scaled" or may be subject to mineral buildup depending on the composition of the water 102 (e.g., especially when exposed to "hard water" high in minerals and/or dissolved solids). The ozonation apparatus 100 may be cleaned and/or descaled (e.g., removal of calcification and other precipitated minerals) through one or more devices, systems, and/or methods. In one or embodiment, a descaling chemical (in the form of a tablet, concentrated liquid, powder, and/or slow release capsule) may be manually added according to instructions provided to a user. For example, the user may be instructed to fill the tank 101 to a 25% water level, add a predetermined amount of descaling solution, wait a set time, and the flush the tank 101 with one or more full tanks of the water 102. The descaling chemical may be manually added (e.g., through an opening in the tank 101 upon filling), may be incorporated into an inflow (e.g., entering through the water inlet 201), and/or from an automatic dispenser (e.g., set in the roof of the tank 101). If automatically dispensed from a maintenance unit 518 (as shown and described in FIG. 5), the maintenance unit 518 may be controlled by the control unit 500 and coordinated with factors indicating the need for descaling, including a timer, a water throughput of the water 102 (as may be measured by a flow meter 516), one or more metrics of the operation of the electrode 205 such as an increase in resistivity of the electrode 205 and/or loss of energy efficiency over time, etc.

Figure 2:
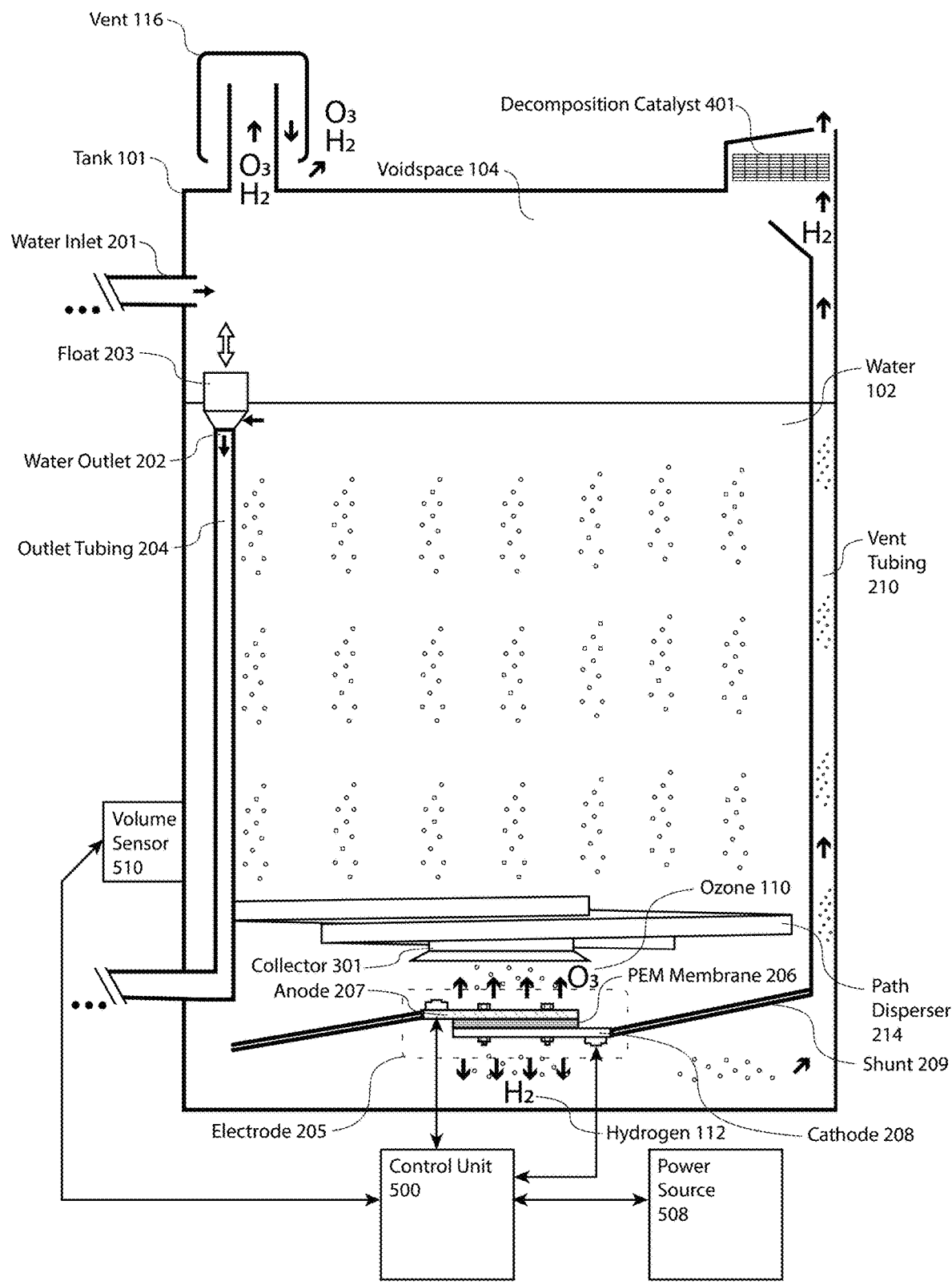
FIG. 2 is another instance of an ozonation apparatus further illustrating an electrode generating ozone at an anode and hydrogen (e.g., diatomic hydrogen) at a cathode, the ozone dispersed through a path disperser and the hydrogen conveyed to a decomposition catalyst through a vent tubing, a water outlet with a float drawing water from the tank near the top of the water level and a volume sensor providing input to a control unit usable to determine an appropriate treatment program, according to one or more embodiments.

FIG. 2 is another instance of an ozonation apparatus, the ozonation apparatus 200, further illustrating an electrode 205 generating ozone 110 at an anode 207 and hydrogen 112 at a cathode 208, the ozone 110 dispersed through a path disperser 214 and the hydrogen directed to a decomposition catalyst 401 through a vent tubing 210, a water outlet 202 with a float 203 drawing water 102 from the tank 101 near the top of the water level and a volume sensor 510 transmitting data and/or a signal usable to determine an ozonation treatment to a control unit 500, according to one or more embodiments.

Figure 4:
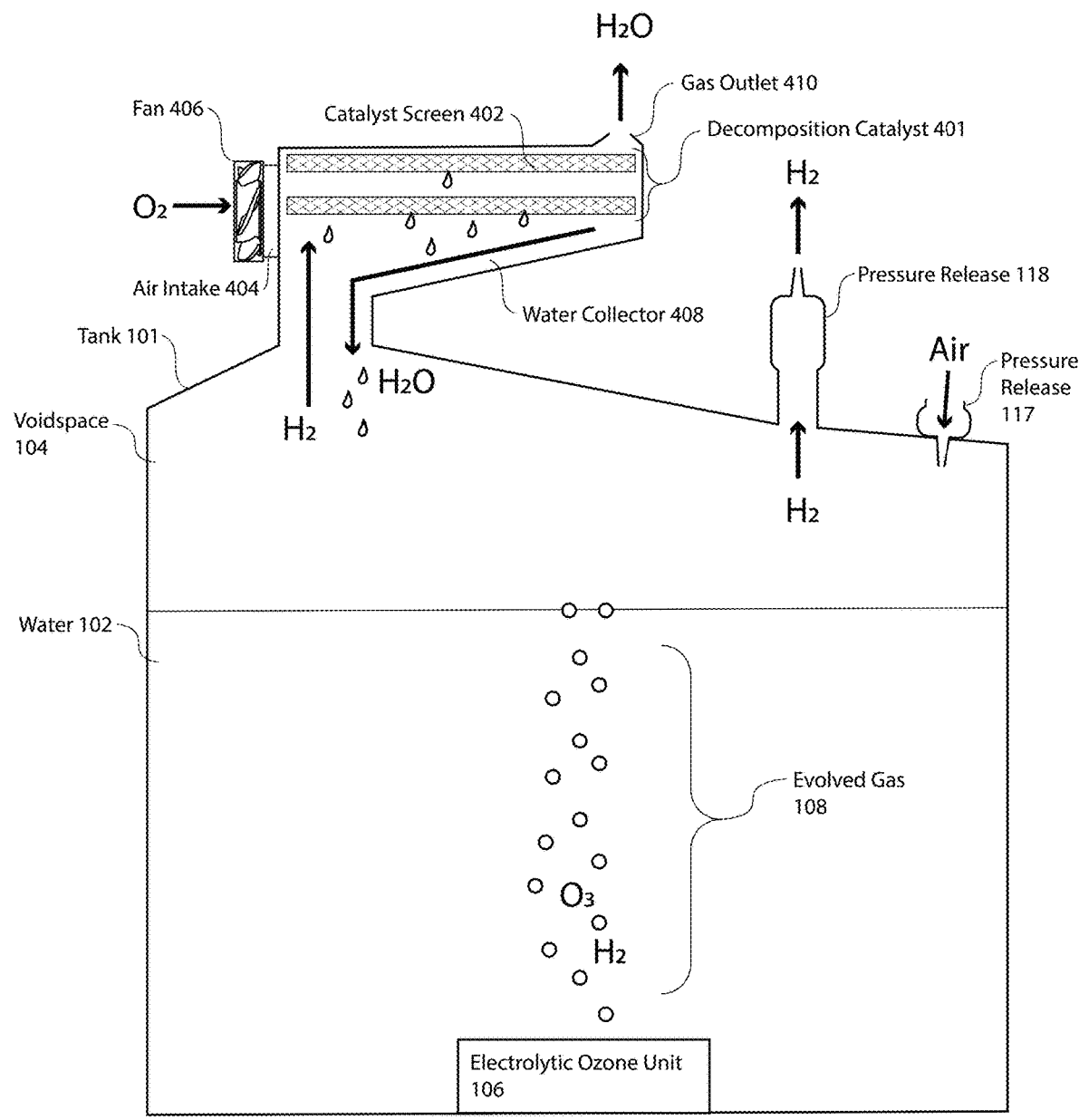
FIG. 4 illustrates yet another instance of an ozonation apparatus, and further illustrates the decomposition unit including an air intake, a decomposition catalyst instantiated as one or more catalyst screens maximizing surface area, a gas outlet, and a water collector, according to one or more embodiments.

The tank 101 includes a water inlet 201 that may be used to add water to the tank 101, and a water outlet 202 that may be used to remove and/or use water from the tank 101. Water 102 may be added and/or removed from the tank 101, for example, through mechanical pumping, pressure pumping, pressure gradients, and/or gravity feed. In one or more embodiments, the water outlet 202 may draw water from a bottom portion of the tank 101 (e.g., as shown in FIG. 4). However, in one or more embodiments including the embodiment of FIG. 2, the water outlet 202 draws water from the top of the water level through an outlet tubing 204. Water 102 drawn from the top of the water level may have a higher ozone concentration. The water outlet 202 may be maintained near the top of the tank 101 by a float 203. The float 203, for example, may be made of a buoyant material such as foam, a hollowed void, and/or other air infused polymer. The outlet tubing 204 may be a flexible tubing or hose such as Tygon® tubing.

The electrode 205 comprises an anode 207, a cathode 208, and in one or more embodiments a protein exchange membrane 206 (labeled the PEM membrane 206) electrically coupling the anode 207 and the cathode 208. Although one pair of the anode 207 and the cathode 208 are shown, there may be multiple pairs in various configurations within the electrolytic ozone unit 106. In one or more embodiments, the anode 207 may be made of, for example, antimony doped tin oxide-nickel dip-dried on a titanium substrate, and the cathode 208 may be made of stainless steel. When power is supplied and/or an electrical current is applied to the electrode 205, ozone 110 may be produced at the anode 207 and hydrogen 112 may be produced at the cathode 208 while the electrode 205 is exposed and/or submerged in water (e.g., the water 102). A portion of the ozone 110 may be dissolved, and a portion produced as gas, e.g., in the form of bubbles. The bubbles of the ozone 110 may initially rise above the electrode 205. The bubbles of the hydrogen 112 may be sequestered and/or directed into a vent tubing 210, as described below. In one or more embodiments the PEM membrane 206 is omitted and the water 102 may be used to bridge the electrical current between the anode 207 and the cathode 208.

The ozone 110 may come in contact with and/or enter the disperser 114, specifically, in the embodiment of FIG. 2 and one or more embodiments, a collector of the path disperser 214 (e.g., the collector 301) may collect rising bubbles of ozone 110. The path disperser 214 may be an instance of the disperser 114 that is a single bubble path 302 helically coiled. Bubbles of the ozone 110 may then move along the bubble path 302 to increase contact time with the water 102 to generate an induced flow and/or to be distributed in various locations around the tank 101 (e.g., the bubble path 302). In one or more embodiments, movement of the bubbles of ozone 110 along paths of the path disperser 214 may increase total time in contact with the water 102 and therefore may increase contact time and/or concentration of the ozone 110 that is dissolved in the water 102.

In one or more embodiments, movement of the bubbles of ozone 110 along paths the path disperser 214 may permit distribution of dissolved ozone 110 and/or the bubbles of ozone 110 to various locations of the tank 101. In one or more embodiments, movement of the bubbles of ozone 110 along paths the path disperser 214 may generate an induced flow (e.g., the induced flow 306 of the water 102 within the tank 101). The disperser 114 may be positioned above and/or flow-coupled for bubble transport to the electrode 205 through various means, including being suspended above the electrode 205 through one or more legs or supports (e.g., the support 308 of FIG. 12A), and/or through other means such as suspension from the roof of the tank 101 and/or connection to the walls of the tank 101.

Hydrogen produced at the cathode 208 may be directed, shunted, and/or conveyed to a decomposition catalyst 401 that may be part of a decomposition unit 120 (not labeled in the embodiment of FIG. 2). The hydrogen 112 may be directed, shunted and/or conveyed to the shunt 209. In one or more embodiments, including the embodiment of FIG. 2, the hydrogen 112 may be directed to a vent tubing 210 that may run along a wall of the tank 101. The vent tubing 210 may run upward to a top portion of the tank 101 and may be fed into a vent 116 and/or a decomposition unit 120. It should be noted that in the embodiment of FIG. 2 the vent 116 is shown positioned over the voidspace 104, rather than the vent tubing 210. However, the vent 116 and/or an additional instance of the vent 116 may also be positioned over the vent tubing 210. The shunt 209 may be configured such that water can freely flow around and to the electrode 205 while the hydrogen 112 bubbles are still retain in a channel of the shunt 209 and/or conveyed to the vent tubing 210.

The hydrogen 112 may then be passed over a decomposition catalyst 401 to result in one or more decomposition molecules. For example, the decomposition catalyst 401 may be platinum metal in the presence of oxygen, resulting in a decomposition molecule comprising water. Where the vent tubing 210 is directed toward a vent 116, the area within the vent tubing 210 which can accumulate hydrogen 112 may be minimized to reduce the chance of buildup of a reducing agent and/or flammable gas. Where the vent tubing 210 is open to the voidspace 104, as shown in the embodiment of FIG. 2, hydrogen may generally be directed toward the decomposition catalyst 401. An example of the decomposition unit 120 is shown and described in further detail in the embodiment of FIG. 4. Additional decomposition catalysts may be selected for certain byproducts of electrolyte, e.g., to decompose diatomic halogens generated from salts and/or halogen oxides.

The vent 116 is shown in cross section in a schematic form as a pipe and cap (both unlabeled) having a spacing permitting the exchange of gas with an environment outside the tank 101, including for example the release of ozone 110 and/or hydrogen 112. In one or more embodiments, the vent 116 may be a unidirectional vent and/or valve. In one or more embodiments, the vent 116 may be a bidirectional vent and/or valve. In one or more embodiments, the vent 116 may be mechanically and/or electrically opened, closed, and/or adjusted.

A control unit 500 comprises a circuit and/or a computer that controls the electrode 205 to determine ozone production. For example, the control unit 500 may include circuits that manipulate signals and/or computer readable instructions that when executed: (i) detect a depth indicator or volume indicator data received from a volume sensor 510; (ii) determine an appropriate start time and duration for operation of the electrode 205; (iii) determine proper parameters in which to run the electrode 205; (iv) shut off the electrode 205 in the event of an error or other malfunction (including insufficient water in the tank 101, insufficient electrolyte 102, and/or excessive tilt tangle); (v) activate the electrode 205 in response to the addition of water 102 to the tank 101; (vi) activate the electrode 205 according to a schedule; (vi) activate a warning indicator if the tank 101 is at too great an angle for a given instantiation of the disperser 114 to operate, and other functions. The control unit 500 and/or the electrode 205 is powered by a power source 508 (e.g., a 12V battery of a vehicle, a 24V batter receiving direct current from a solar array, a 120V 60 Hz wall socket). The volume sensor 510 may be based on pressure, sensing water through electrical resistance (e.g., using the conductivity sensor 520), sensing weight of the tank 101, and other systems, devices, and/or methods as may be known in the art. The control unit 500 is further shown and described in conjunction with the embodiment of FIG. 5.

FIG. 3 illustrates an example of the disperser 114 of FIG. 1, including a dispersion cone 300 that may be positioned above the ozone generator 103, including a set of bubble paths 302 (e.g., the bubble path 302A, the bubble path 302B) for slowing the vertical rise (e.g., vertical movement) of the ozone 110 that is in a gas form and/or deflecting the ozone 110 that is in the gas form horizontally from the ozone generator 103, according to one or more embodiments. FIG. 3 also illustrates a subset of the bubble paths 302 including one or more dispersion holes 304 releasing undissolved ozone 110 as bubbles into various regions of the tank (e.g., the tank 101), according to one or more embodiments.

An upper portion of FIG. 3 illustrates an underside of the dispersion cone 300, and a bottom portion of FIG. 3 illustrates a side view of the dispersion cone 300. A separator 307 may split a stream of bubbles rising from the ozone generator 103 such that bubbles are channeled into and/or conveyed into different instances of the bubble paths 302. The underside of the dispersion cone 300 is sloped such that bubbles traveling in the bubble path 302 may follow the bubble path 302 and are thereby slowed in their rise velocity and/or deflected horizontally from the origin of the ozone generator 103 until reaching a path terminus 305 of the bubble path 302 and/or a dispersion hole 304 of the bubble path 302. In the embodiment of FIG. 3, sixteen bubbles paths 302 are shown, and two are labeled (the bubble path 302A and the bubble path 302B). Each of the bubble paths 302 are separated by an instance of the divider 309 (one is shown labeled). The divider 309 may be a small barrier to retain bubbles within each instance of the bubble path 302.

The bubble path 302A is illustrated without any instances of the dispersion hole 304 such that any bubbles channeled into the bubble path 302A may exit the bubble path 302A at the path terminus 305 of the bubble path 302A. The bubble path 302B illustrates inclusion or a set of dispersion holes 304 (fourteen such dispersion holes 304 are illustrated, and one is labeled) arranged such that bubbles may randomly exit the bubble path 302B in various locations along the bubble path 302B. For clarity, in the embodiment of FIG. 3, holes are shown in solid black circles or ovoids, and bubbles are shown in open circles. In one or more embodiments, the disperser 114, for example the dispersion cone 300, may act as a passive transport of zone 110 bubbles within the water 102 to help distribute the ozone 110 and/or increase ozone 110 dissolution (e.g., increase concentration of dissolved ozone 103). In one or more embodiments, deflecting the ozone 110 rising from the ozone generator 103 (e.g., the electrolytic ozone unit 106) may increase ozone 110 concentration per unit of power of the power source 508.

FIG. 4 illustrates yet another instance of an ozonation apparatus 400, and further illustrates the decomposition unit 120 including an air intake 404, a decomposition catalyst 401 as one or more catalyst screens 402 (e.g., a catalyst screen 402A through a catalyst screen 402N), a gas outlet 410, and a water collector 408, according to one or more embodiments. In one or more embodiments including the embodiment of FIG. 4, no instance of the disperser 114 is included or otherwise required in the ozonation apparatus and/or a system comprising the tank 101, the electrolytic ozone unit 106, the vent 116, and/or the decomposition unit 120. The evolved gas 108 leaves the electrolytic ozone unit 106 and moves through the water 102, with some becoming dissolved and/or oxidizing organic molecules or other chemicals in the water 102, and other portions reaching the voidspace 104 as bubbles of gas. Hydrogen gas, which is generally lighter than air, may move up into the decomposition unit 120 before substantially mixing with other gasses such as common air, diatomic oxygen, diatomic nitrogen, argon, trace gases, the ozone 110, etc. that may exist in the voidspace 104. Hydrogen gas may also mix with other gasses in the voidspace 104 and the mixture moved through the decomposition unit 120.

The decomposition unit 120 may comprise one or more components for decomposition of diatomic hydrogen gas. In one or more embodiments including the embodiment of FIG. 4, at least some of the hydrogen gas is directed over a decomposition catalyst 401. The decomposition catalyst 401 may be a catalytic cast or metal woven into a screen (e.g., to increase surface area for catalytic reactions), denoted the catalyst screen 402. The decomposition catalyst 401 for example may comprise platinum in the presence of oxygen, where the metal and/or alloy comprising platinum is woven and/or otherwise produced as a mesh, screen, matrix, or honeycomb structure. Other metal catalysts may also be possible, such as palladium. Additional methods may be used as known in the art to increase surface area of the decomposition catalyst 401. For example, a ceramic monolith having a rough surface with a metallic coating and/or a honeycomb structure may be utilized as known in the art of vehicle catalytic converters. Although not shown, additional structures such as hydrogen sequestration and/or synthetic reactions utilizing hydrogen may also be possible to remove hydrogen from a gaseous and/or diatomic state where it may pose a hazard.

Diatomic oxygen (or a different reagent needed for decomposition) may be brought into the decomposition catalyst 401 through an air intake 404. The air intake 404 may include one or more fans 406 to push outside air into the decomposition catalyst 401. Products of the decomposition process may be output through the gas outlet 410. In such case that platinum and diatomic oxygen are utilized, a primary decomposition product may be water. Water vapor may exist through the gas outlet 410 and/or may condense and fall back into the water 102 of the tank 101. Although not shown in the embodiment of FIG. 4, an instance of the fan 406 may also be placed on the gas outlet 410. Where two fans 406 are utilized (e.g., a fan 406A at the air intake 404 and a fan 406B at the gas outlet 410), an airflow through the decomposition unit 120 may generate a low pressure zone further pulling gasses from the voidspace 104 into the decomposition unit 120, which, for example, may be relieved by intake of air from the pressure release 117.

Optionally, the pressure release 117 may be a unidirectional vent and/or valve for intaking outside air to relieve low pressure and/or an induced vacuum that may be generated as water 102 is withdrawn from the tank 101 and/or the tank 101 undergoes thermal fluctuations that may change gas volume.

Figure 5:
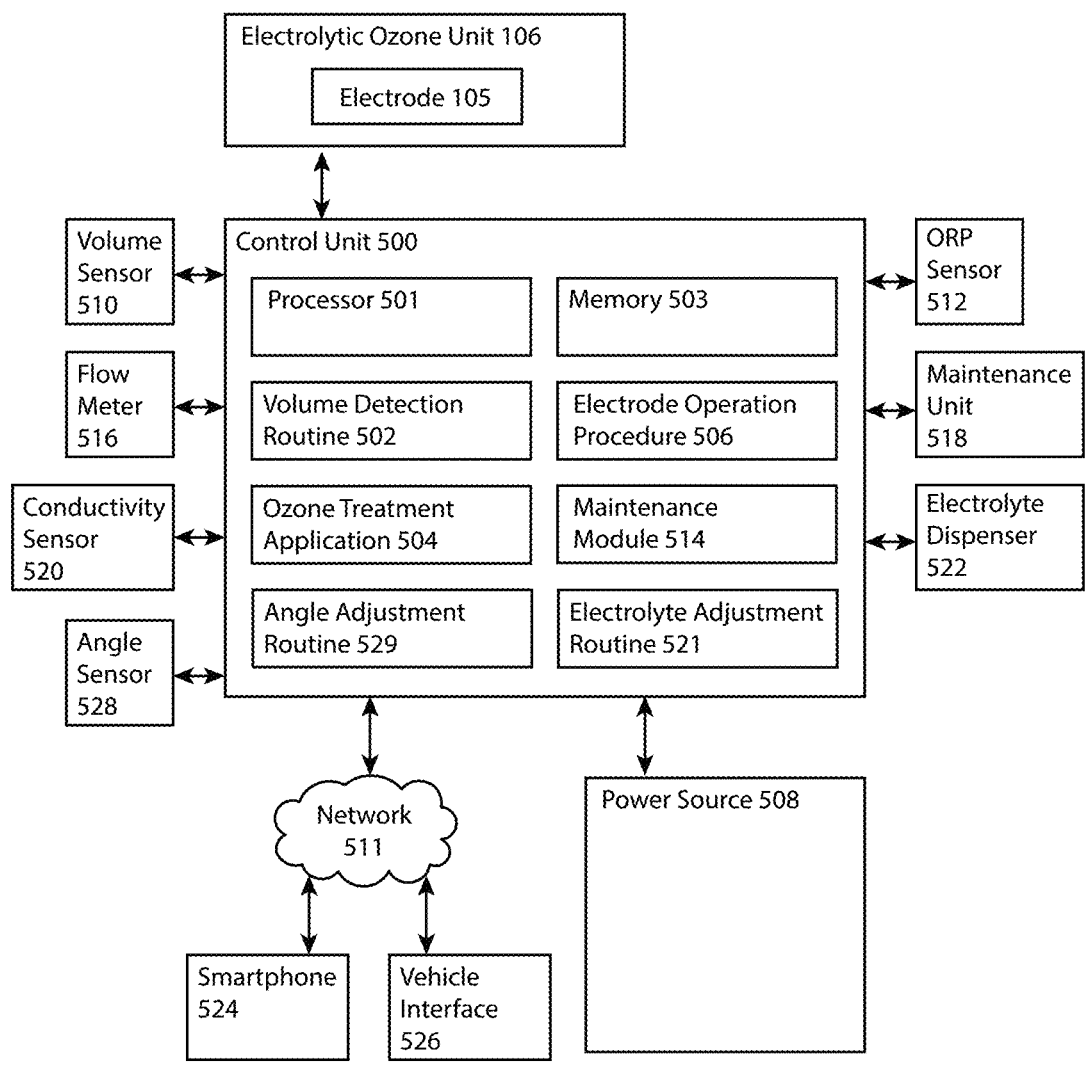
FIG. 5 illustrates the control unit that may be used to control frequency, duration, actions in response to sensing a tilt angle, actions in response to electrolyte concentration sensing, and other aspects of the ozone treatment of the water and maintenance of an ozonation apparatus, according to one or more embodiments.

FIG. 5 illustrates a control system 550 comprising the control unit 500 that may be used to control frequency, duration, and other aspects of the ozone treatment of the water, according to one or more embodiments. The control unit 500 may be implemented through circuits, integrated circuits, printed circuit boards, microcontrollers, and/or other signal and data processing circuitry. The processor 501 may be a computer processor. The memory 503 may be a computer memory (e.g., RAM, ROM, solid state memory, etc.). The control unit 500 is communicatively coupled to one or more components, such as the electrolytic ozone unit 106, the volume sensor 510, the network 511 (e.g., the internet, a wide area network, a local area network, a WiFi network, a piconet, a virtual private network), the oxidation reduction potential sensor 512 (labeled and also referred to as the "ORP sensor 512"), the flow meter 516, the maintenance unit 518, the conductivity sensor 520, and/or the electrolyte dispenser 522. The control module is electrically coupled with the power source 508, which may also power the electrolytic ozone unit 106. The control unit 500 may be communicatively coupled through the network 511 to a smartphone 524 (e.g., running a smartphone app communicating with the control unit 500 through APIs), a vehicle interface 526 (e.g., a dashboard of a recreational vehicle), or another computing device now shown in the embodiment of FIG. 5 (e.g., an industrial control system computer of a municipal water supply). The control unit 500 may be configured, controlled, communicate, send and receive warnings, and/or communicate through application programming interfaces (APIs) with the smartphone 524, vehicle interface 526, and/or other computing device.

The volume detection routine 502 comprises computer readable instructions and/or one or more circuits that receive a signal and/or data indicating a water level and/or water volume and communicates and/or calls one or more other circuits, memory addresses, and/or blocks of executing software code with a signal and/or data indicating water volume in the tank 101. For example, the volume detection routine 502 may comprise computer readable instructions stored in the memory 505 that when executed on the processor 501 detects a water level of the water 102 in the tank 101, references a data table calibrated to a size of the tank 101, and communicates the volume of the water 102 remaining in the tank 101 to the ozone treatment application 504. The volume sensor 510 may send signals and/or data through a wire bus or other signal or data wired or wireless connector. The volume sensor 510 may sense depth or volume based on electrical conductivity, pressure, weight, acoustical and/or ultrasonic sensing of depth, mechanical float height sensor, light dispersion sensing, and/or through other means known in the art.

The ozone treatment application 504 may comprise one or more circuits and/or computer readable instructions that when executed determine ozonation treatment prescriptions for the water 102. The ozone treatment application 504 may comprise computer readable instructions that when executed determines when such treatment occurs, including initiating and/or scheduling treatment upon occurrence of one or more trigger events. In one or more embodiments, the ozone treatment application 504 comprises computer readable instructions that when executed determines and/or reference data specifying a schedule for ozonation of the tank 101 based on factors such as the size of the tank 101, the intended use of the water (e.g., potable or non-potable), the detected dirtiness of the water in the tank 101 or about to enter the tank 101 (as may be sensed through a particulate matter sensor, cloudiness of an optical sensor, and/or through other means and/or as may be provided through manual input) the average water 102 use rate, the current volume of water 102 in the tank 101, the oxidation reduction potential (ORP) of the water 102 (as may be measured by the ORP sensor 512), and/or other factors. For example, the ozone treatment application 504 may comprise computer readable instructions that when executed trigger activation of the electrode 105 once per day (for a time period appropriate for the depth), unless new water 102 is added to the tank 101 in which case ozonation may be triggered within 2 minutes of sensing the depth has stabilized.

The electrode operation procedure 506 comprises computer readable instructions that when executed on the processor 501 supplies the electrolytic ozone unit 106 with power from the power source 508, for example in response to an activation call from the electrode operation procedure 506. The electrode operation procedure 506 may include computer readable instructions that when executed receive input from one or more sensors in the electrolytic ozone unit 106 to determine proper operation, for example to cut off and/or inhibit power to the electrode 105 if electrical resistance and/or temperature of the electrolytic ozone unit 106 rises (which may indicate insufficient water is available to operate the electrode 105). Additional factors for operation may include, for example, the age and/or hours of operation of the electrode 105, particulate matter in the water 102, electrical conductivity of the water 102, and other factors.

The maintenance module 514 comprises computer readable instructions that when executed determine a maintenance requirement, generate a maintenance warning, and/or automatically begin a maintenance procedure for the ozonation apparatus (e.g., the ozonation apparatus 100, the ozonation apparatus 200, the ozonation apparatus 400). For example, upon occurrence of certain condition the user may be notified maintenance is required or appropriate. In one or more embodiments, the requirement and/or the warning is based on one or more of: expiration of a timer (e.g., 2 weeks, 2 months), an amount of water 102 treated and/or moved through the tank 101 (e.g., 2000 gallons as measured by the flow meter 516), resistivity of the electrode 205, electrical efficiency of the electrode 205, other operation metrics of the electrode 205, drop in sensed oxidation reduction potential per unit of power expenditure, etc. In one or more embodiments, the maintenance module 514 may automatically execute a descaling routine, including without limitation adjusting the water level in the tank 101 to a certain level, dispensing a descaling chemical from the maintenance unit 518, setting a timer, determining expiration of the timer, draining the tank 101, flushing the tank 101 with water 102 (which may or may not be treated with ozonation), and possibly repeating the process one or more times.

In one or more embodiments, the control unit 500 may also automatically sense and/or monitor conductivity of the water 102 (including during an ozone treatment) and may automatically add an electrolyte from an electrolyte dispenser 522. For example, where the conductivity and/or ionic concentration of the water 102 is below a threshold value, computer readable instructions may be executed on the processor 501 to dispense an electrolyte tablet from the electrolyte dispenser 522. Conductivity and/or total dissolved solids may be measured through measuring resistance between two leads. For example, the conductivity may be an expression of the ability of a solution to conduct electric current. Conductivity may be expressed as a microsiemen (micro-Siemens per centimeter or μS/cm) or in higher conductivity levels as a millisiemen, and may be the reciprocal of resistivity.

In one or more embodiments, an electrolyte adjustment routine 521 comprises computer readable instructions that when executed take one or more actions such as adjusting the an ozone treatment based on an sensed electrolyte concentration in the water 102. In one or more embodiments, the electrolyte adjustment routine 521 comprises computer readable instructions that when executed: (i) determine an electrolyte concentration in the water 102, (ii) generate a notification that the electrolyte concentration is below the second threshold value; (iii) deactivate the electrode 105 by preventing the supply of power from the power source 508 to the electrode 105 when determining the electrolyte concentration is below a second threshold value; and generate a dispensing instruction to dispense an electrolyte into the water 102.

The control unit 500 may also include an angle adjustment routine 529. The angle adjustment routine 529 comprises computer instructions that may detect an angle and take one or more actions in response, including adjusting a treatment parameter. In one or more embodiments, the angle adjustment routine 529 comprises computer readable instructions that when executed: (i) detect an angle of the tank 101 and/or the disperser 114; (ii) determine the angle of the tank 101 and/or the disperser 114 exceeds a threshold value; (iii) generate a notification of the exceeded threshold value; (iv) deactivate the electrode 105 (and/or an ozone generator 103) by preventing the supply of the power from the power source to the electrode when determining the angle of the tank 101 and/or the disperser 114 exceeds the threshold value.

In one or more embodiments, the vent 116, the decomposition unit 120, and/or the pressure release 118 may be screwed onto existing threads or other entry points of the tank 101. In one or more embodiments, the tank 101 may be open and the disperser 114 may be used to disperse the evolved gas 108 where permitting the evolved gas 108 to freely exit the top of the tank 101.

Figure 6:
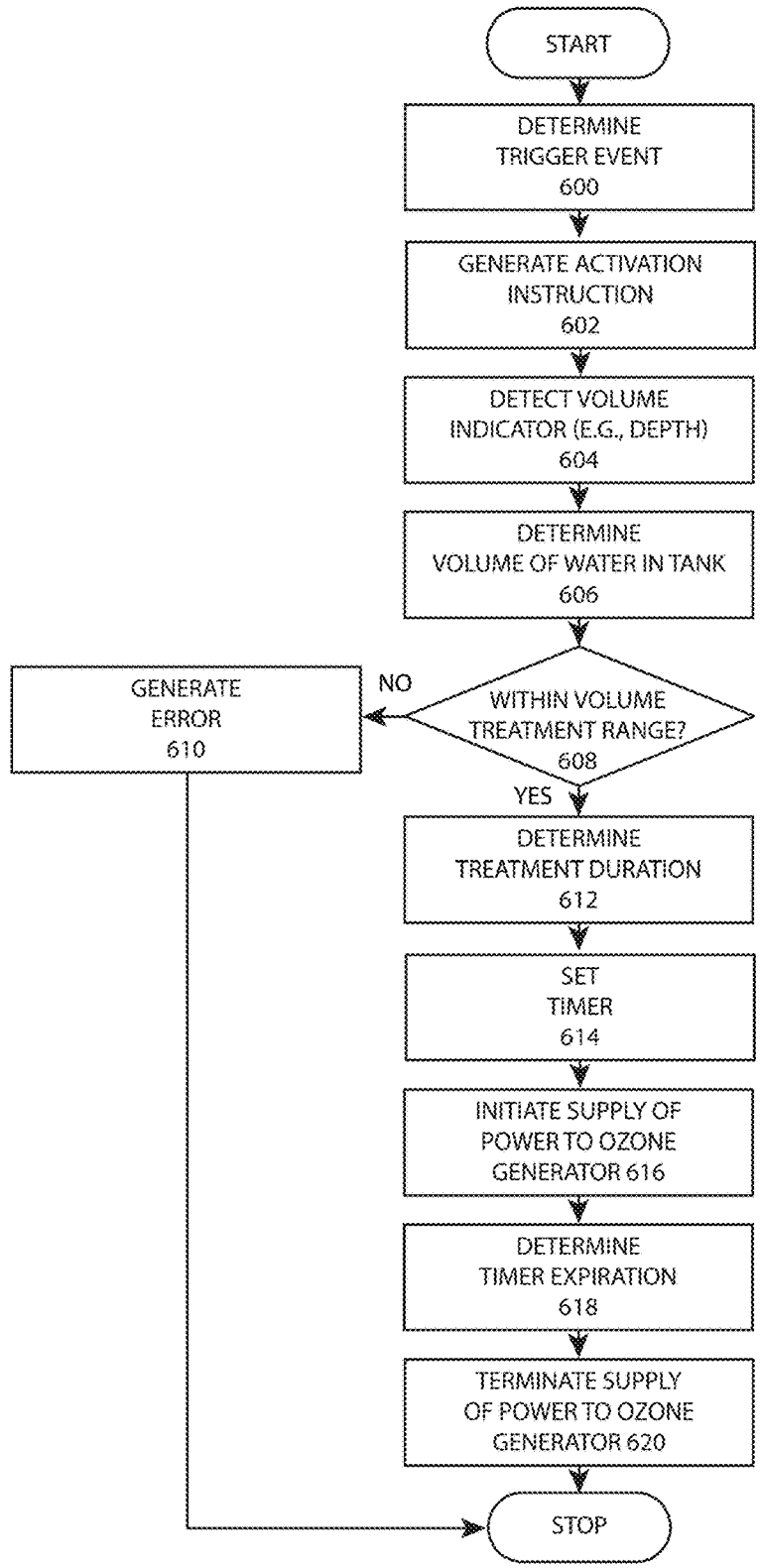
FIG. 6 illustrates a treatment program process flow, according to one or more embodiments.

FIG. 6 illustrates a treatment program process flow 650, according to one or more embodiments. Operation 600 determines a trigger event. For example, the trigger event may be a elapse of a timer period, occurrence of a scheduled event, a detection event (e.g., detection of a bacteria, alga, fungus, or virus), and/or another event. The trigger event may be manually sensed, or may be unrelated to the ozonation apparatus 100 such as an outside event received from an API call to the control unit 500. Operation 602 generates an activation instruction to activate the ozone generator 103. In one or more embodiments, the activation instruction may be generated by the control unit 500 (following determination of the trigger event), and/or received by the control unit 500. Operation 604 detects a volume indicator which is a piece of information and/or data usable to calculate volume within the tank 101. For example, the volume indicator may be a depth (e.g., where total volume of the tank 101 and/or volume at one or more depth increments may be known), a weight (e.g., where a tare weight of the tank 101 is known), and other information usable to determine volume. Operation 606 determines the volume of the water 102 in the tank 101 from the volume indicator.

Operation 608 is a decision determining whether the volume of the water 102 in the tank 101 is within a treatment range. For example, the water 102 may be less than a threshold amount required for proper treatment, for example where the ozone 110 gas generated by the ozone generator 103 cannot properly move into and/or through the disperser 114, as may determined through relatively easy testing of any of the instances of the present embodiments at several volumes of the water 102 for a given size and/or shape of the tank 101. In another example, the water level may be too high to permit proper functioning of the vent 116 and/or have sufficient voidspace 104 if such voidspace 104 is required for operation of the vent 116, the decomposition unit 120, and/or the pressure release 118. Where the volume is not the acceptable range, operation 608 may proceed to operation 610 which may terminate. Alternatively, or in addition, water 102 may be added and/or removed from the tank 101 until a volume within the range is reached, for example as shown and described in conjunction with operation 702 and operation 704 of FIG. 7.

Operation 612 determines a treatment duration. For example, a treatment duration may be equal to a number of minutes of operation of the ozone generator 103 per liter of the water 102 (e.g., 3 minutes per liter). In one or more embodiments, the treatment duration may also depend on other factors, for example electrolyte concentration, intended use of the water 102 (e.g., disinfection, potable water uses, non-potable water uses, de-odorizing solution, cleaning agent, etc.), the source of the water 102 (e.g., pre-treated municipal water, muddy untreated lake water, etc.). Operation 614 sets a timer associated with the treatment duration.

Operation 616 initiates the supply of power (e.g., from the power source 508) to the ozone generator 103. The supply of power may be appropriate to generate ozone 110 depending on the type of ozone generator 103 (e.g., coronal discharge, electrolytic), as may be modified by any additional factors (e.g., electrolyte concentration, sensed electrical resistance in the electrode 105 which may indicate the buildup of scale and/or solids, etc.). Operation 618 determines expiration of the timer. Operation 620 may then terminate the supply of power to the ozone generator 103. It should be noted that the treatment duration may, in one or more embodiments, be based on an assumed rest time for the water 102 in which the ozone 110 is permitted to remain in contact with the water 102 to increase a time period for oxidative reactions and/or chemistry in treating the water. If water 102 is sensed and/or determined to be withdrawn from the tank 101, ozone generation may resume and/or increase to increase the probability of safe and/or effective treatment.

Figure 7:
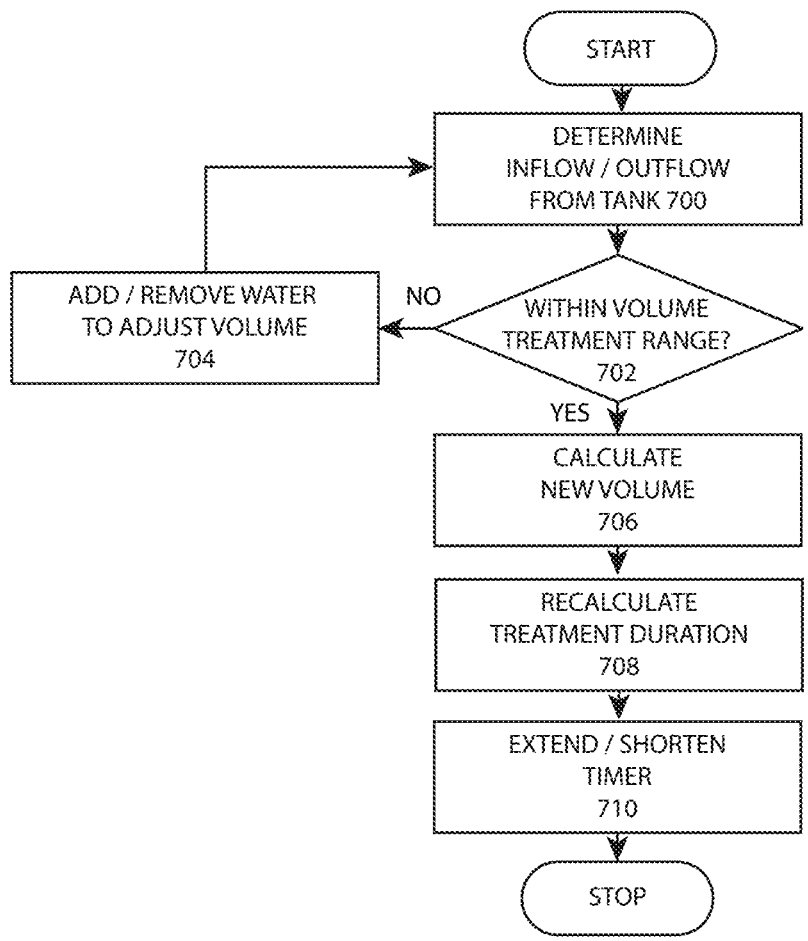
FIG. 7 illustrates a volume change treatment program adjustment process flow, according to one or more embodiments.

FIG. 7 illustrates a volume change treatment program adjustment process flow 750, according to one or more embodiments. The process flow of FIG. 7 may run independently from or concurrently with the process flow of FIG. 6, for example operation 700 initiated and/or triggered during any of the operation 600 through the operation 620 of FIG. 6. Operation 700 determines an inflow and/or an outflow of water 102 into the tank 101. The inflow may be untreated water, and the outflow may be treated water. The inflow may enter through an inlet (e.g., the water inlet 201), and the outflow may exit the tank 101 through an outlet (e.g., the water outlet 202). The inflow and/or outflow may occur simultaneously. The inflow and/or outflow may be detected through a change is depth of the water 102, a change in the weight of the tank 101, through one or more flowmeters (e.g., the flowmeter 516), and/or through other means. Operation 702 determines whether a new volume is within a treatment range volume. If the volume is not within the treatment range, operation 702 may proceed to operation 704 which may adjust the volume, for example by triggering an inflow where the new volume is less than the treatment range volume and triggering an outflow where the new volume is greater than the treatment range volume. Operation 706 calculates a new volume, for example following any inflow and/or outflow of the water 102. Operation 708 re-calculates the treatment duration based on the new volume. For example, in one or more embodiments the treatment duration may determined by a linear function dependent on volume of the water 102. Where a starting volume of the water 102 is three liters, and a new volume is four liters following an inflow, the treatment duration may be increased by one-third (approximately 33.3%). Operation 710 may then extend or shorten the timer based on the re-calculated treatment duration. However, in one or more other embodiments, non-linear functions can be used.

In one or more embodiments, addition of inflow following a first treatment with ozone 110 that has already ended may result in a partial re-treatment of the water 102 in the tank 101. For example, where the starting volume of the water 102 is three liters, which has been fully treated over nine minutes, and an inflow increases the volume to four liters at a later time, a second treatment may depend upon a calculation of residual ozone remaining based on approximate half-life. For example, the second treatment may be five minutes if initiated close enough in time to the first treatment. Data specifying the previous treatment volumes and/or times may be stored in the memory 503 of the control unit 500 (e.g., a treatment data and/or a treatment log).

Figure 8:
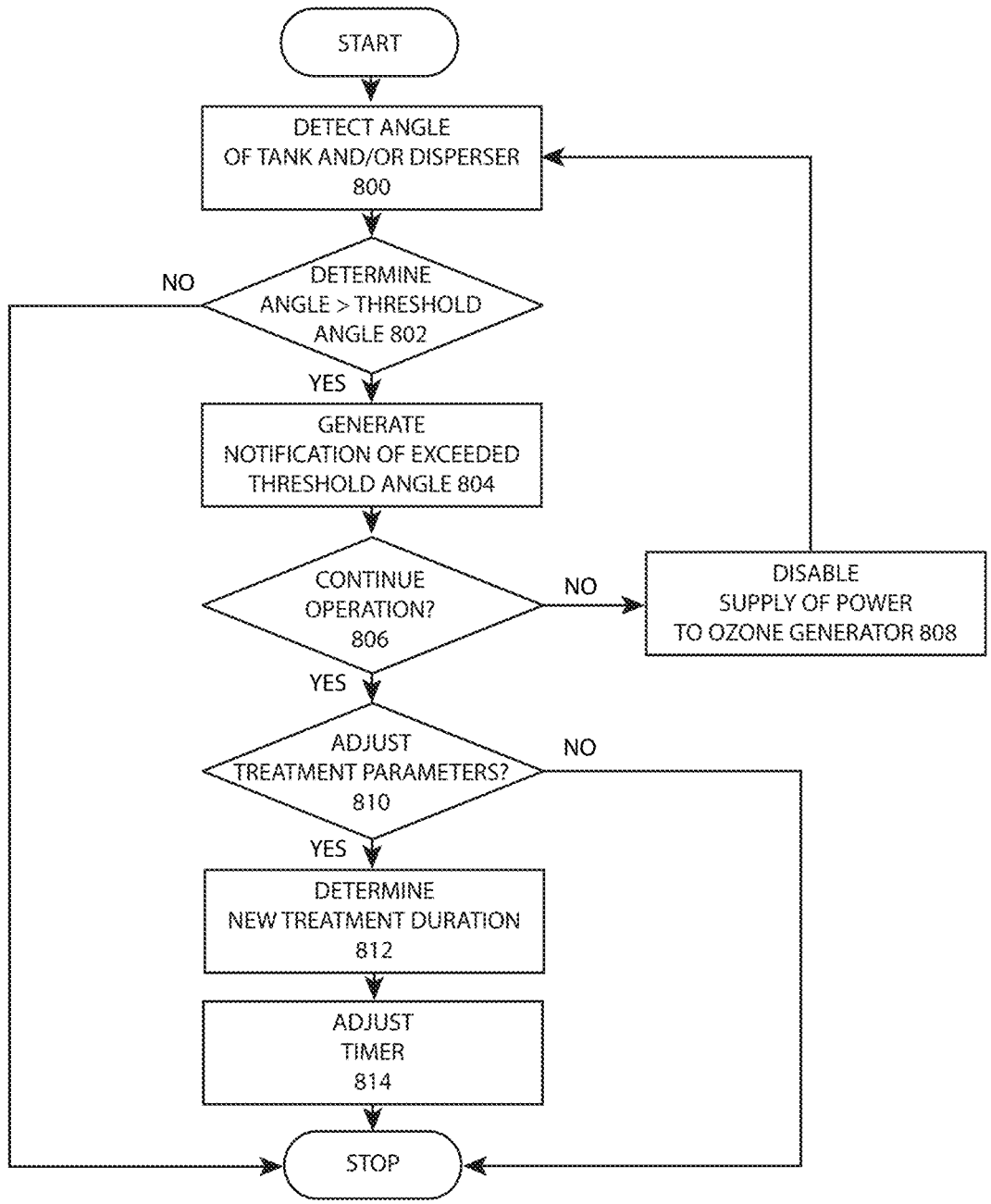
FIG. 8 illustrates an angle treatment program adjustment process flow, according to one or more embodiments.

FIG. 8 illustrates an angle treatment program adjustment process flow 850, according to one or more embodiments. In one or more embodiments, the disperser 114 may operate optimally when within certain angles, e.g., such that ozone 110 bubbles are properly collected and stay within the bubbles paths 302. Operation 800 detects an angle of the tank and/or the disperser. For example, the angle may be determined through use of the angle sensor 528 (e.g., an electronic tilt sensor, a conductive free mass sensor, a bubble level, an electronic plumb level, etc.). Operation 800 may detect a range of angles (e.g., via a continuous angle sensor) or discrete angles (e.g., 5 degrees of tilt, 10 degrees of tilt, 15 degrees of tilt, etc.). Operation 800 may also detect a binary angle (e.g., less than 15 degrees or greater than 15 degrees). Operation 802 determines that the angle is greater than a threshold angle. The threshold angle, for example, may be an angle significant to the types of angles encountered by a vehicle or other moving system to which the tank 101 may be attached or otherwise associated. For example, in the case of a recreational vehicle and/or motorhome, the angle may be 15 degrees. With respect to a mobile water treatment unit on a trailer, the angle may be 20 degrees. If the threshold angle is not exceeded, operation 802 may end. If the threshold angle is exceeded, operation 802 may proceed to operation 804.

Operation 804 generates a notification (e.g., data specifying information) that the threshold angle has been exceeded. For example, the notification may include text data alerting a user such as: "water treatment system is too tilted," or "tank is not level—current tilt exceeds 5 degrees." The notification can also be an alert indicator or light, for example that illuminate an LED light or displays an icon on an LCD display screen. The notification may be communicated to one or more user interfaces. In one or more embodiments, the notification may be sent to the smartphone 524. In one or more embodiments, the notification may be sent to the vehicle interface 526.

Operation 806 is a decision for determining whether to continue operation of the ozone apparatus, system, and/or method. In one or more embodiments, such operation is discontinued when the threshold angle is exceeded, and operation 806 may proceed to operation 808 which disables the supply of power to the ozone generator 103. Operation 806 then returns to operation 800 to determine whether the angle has been resolved. In contrast, operation 806 may also determine treatment is to continue in which case operation 806 may proceed to operation 810. In one or more embodiments, the decision of operation 806 may be a setting the user may preconfigure and/or the decision may be selected by manual input of the user. The decision of operation 806 may also be based on other factors, data, and/or inputs, for example intended use of the water (e.g., as a cleaning solution versus drinking water).

Operation 810 determines whether treatment parameters (e.g., duration, intensity) are to be adjusted. Operation 812 determines a new treatment duration. For example, where the threshold angle is exceeded, treatment time may be increased by 20%. In another example, treatment time may be increased by 4% for each degree of the angle measured in operation 800. Operation 814 then adjusts the timer (e.g., in the event a timer has already been set, e.g., in operation 614 of FIG. 6). Other treatment parameters may also be adjusted to increase effectiveness, for example the current supplied to the ozone generator 103 and/or the electrolyte concentration as shown and described in conjunction with the embodiment of FIG. 9. The process flow of FIG. 8 may run independently and/or concurrently with the process flow of FIG. 6, for example operation 800 initiated and/or triggered during any of the operation 600 through the operation 620 of FIG. 6.

FIG. 9 illustrates an electrolyte treatment program adjustment process flow 950, according to one or more embodiments. In one or more embodiments, treatment effectiveness by the ozone 110 may partially depend on electrolyte concentration, e.g., the rate of electrolytic ozone production, especially where electrical coupling of the anode 207 and the cathode 208 occur exclusively or primarily through the water 102. Operation 900 detects an electrolyte concentration. For example, the electrolyte concentration may be measured for the water 102 in the tank 101 and/or water moving through the water inlet 201. The electrolyte concentration may be measured through conductivity (e.g., via the conductivity sensor 520) or through other means known in the art. Operation 902 determines whether the electrolyte concentration is below a threshold value. For example, the threshold value may less be 200 µS/cm at 25° C., which may be a low end value for conductivity of drinking water. If operation 902 is greater than or equal to the threshold value, operation 902 may return to operation 900, or alternatively may proceed to end. If the electrolyte concentration is less than the threshold value, operation 902 may proceed to operation 904. It should be noted that the "threshold value" as used in the present embodiments is context specific, and for example may pertain to a concentration in FIG. 9, an angle value in FIG. 8, a volume range value in FIG. 7, a pH value in one or more other embodiments, etc.

Operation 904 may generate a notification that the electrolyte concentration is below the threshold value and may communicate the notification similar to the notification described in conjunction with the operation 804 of FIG. 8. Operation 906 determines whether a maximum amount of electrolyte has been added, e.g., within a given time period. A first time operation 906 is encountered within the process flow 900 within the given time period operation 906 may default proceed to operation 908 (e.g., as no electrolyte may have been added yet). Operation 908 dispenses an electrolyte into the water 102, for example by using the electrolyte dispenser 522. The amount dispensed may be calculated based on a detected volume of the water 102. In one or more embodiments, the electrolyte added may include a generally soluble cation and/or anion, for example an alkali metal (e.g., sodium, potassium), an alkaline earth metal (e.g., calcium, magnesium), or a halide (e.g., chloride, bromide, iodide), or more complex anions (e.g., carbonate, bicarbonate, sulfate). Acids and/or bases may also be utilized. In one or more embodiments, a pre-dissolved electrolyte may be added. In one or more other embodiments, the electrolyte may be added in a solid, tablet, and/or powered form. In one or more embodiments, pH may also be sensed and/or adjusted, including for optimal function of the electrode 105 depending on the composition of the electrode and optimal acidity and/or basicity of operation.

Operation 910 waits a period of time for dissolution of the electrolyte. The waiting period may depend on the size of the tank 101 and whether, for example, the tank 101 may include an agitator. Operation 910 then returns to operation 900. In one or more other embodiments, operation 910 may be skipped and one or more detectors may wait threshold electrolyte concentration detected in operation 900. Operation 900 through operation 910 may loop until sufficient electrolyte concentration may be achieved. However, operation 906 may reach a limit of the amount of dispensed electrolyte. For example, it may be determined that the electrolyte is not properly dissolving (e.g., the water 102 is too cold, the dispenser is malfunctioning, etc.). In such case, operation 906 proceeds to operation 912 which generates an error (e.g., an error notification) which may be communicated to the user. The process flow of FIG. 9 may run independently and/or concurrently with the process flow of FIG. 6, for example operation 900 initiated and/or triggered during any of the operation 600 through the operation 620 of FIG. 6.

Although not shown in the present embodiment, the electrolyte concentration may also be determined to be too high. In one or more embodiments, an electrolyte concentration that is too high (e.g., as may occur in "hard" water with high concentration of dissolved minerals) may cause increased rate of scale on one or more components (e.g., the electrode 105). In such case, a notification may be generated and communicated to a user and/or power inhibited from being supplied to the electrode 105.

FIG. 10 illustrates an example of the disperser 114 of FIG. 1, including a collector 301 that may be positioned above the electrolytic ozone unit 106, a dispersion plate 1000 with spiral instances of the bubble paths 302 for circulating bubbles of ozone 110, the bubble paths 302 sloping upward within the dispersion plate 1000 such that bubbles travel along the bubble path 302 and possibly create an induced flow 306, each bubble path 302 terminating in a dispersion hole 304 releasing undissolved ozone 110 as bubbles into various regions of the tank 101, according to one or more embodiments. An upper portion of FIG. 10 illustrates an underside of the dispersion plate 1000, and a bottom portion of FIG. 10 illustrates a cross section of the dispersion plate 1000 through a centerline of the top portion of FIG. 10 depicted through the horizontal broken line. The underside of the dispersion plate 1000 is sloped such that bubbles traveling in the bubble path 302 may continue to follow the bubble path 302 in a spiral until a terminus of the bubble path 302 at a dispersion hole 304. In the embodiment of FIG. 10, four bubbles paths 302 are shown. A first bubble path 302 terminates just below the collector 301 as shown in the underside view of FIG. 10. A second bubble path 302 terminated above the collector 301 as shown in the underside view of FIG. 10. A third bubble path 302 terminates to the left of the collector 301 as shown in the underside view of FIG. 10 and the cross section of FIG. 10. And a fourth bubble path 302 terminates to the right of the collector 301 as shown in the underside view of FIG. 10 and the cross section of FIG. 10. Movement of the evolved gas 108 within the bubbles paths 302 may create an induced flow 306 in the water 102 of the tank 101 which may further disperse the ozone 110 and/or force the bubbles of ozone 110 to remain in contact with the water 102 over a longer period to increase a concentration of dissolved ozone 110. Although not shown, bubble paths 302 may be convoluted and/or have a rough surface to slow bubble movement along the bubble paths 302.

FIG. 11 illustrates another example of the disperser 114, the dispersion tube 1100, comprising periodic and/or continuous dispersion holes 304 along a bubble path 302 defined by a tubing, according to one or more embodiments. A top portion of FIG. 11 is a top-down view, and a bottom portion of FIG. 11 is a side view (for clarification, the bottom portion of FIG. 11 is not a cross section of the top portion of FIG. 11). The collector 301 is shown with a tapered collection hood (unlabeled in the embodiment of FIG. 11). Dispersion holes 304 may be placed on the upper portion of the tubing periodically, e.g., so that bubbles of evolved gas 108 exit the bubble path 302 in various locations. In one or more embodiments, uniformity of distribution along a linear distance of the tubing may be achieved through defining the dispersion holes 304 in increasing frequency along the bubble path. For example, in one or more embodiments and the embodiment of FIG. 11, the dispersion holes 304 occur less frequently in the first few inches of the bubble path 302 than in the last few inches of the bubble path near the terminus. The piping defining the bubble path 302 is shown as having a square cross section, but cylindrical tubing having a circular cross section or tubing of another shape may also be utilized. The tubing and/or dispersion holes 304 may be configured to permit the release of bubbles within the range of angles and/or tilt (e.g., within a threshold value of angle). The tubing may be made of a corrosion resistant material such as stainless steel, brass, anodized aluminum, or plastic.

FIG. 12A illustrates another example of a disperser 114, the dispersion cone 1200, with two instances of a bubble path 302. In one or more embodiments including the embodiment of FIG. 12A, the support 308 may be set in the bottom of the dispersion cone 1200 and suspend the dispersion cone 1200 above the electrolytic ozone unit 106. A set of dispersion holes 304 may rest on the bottom of the tank 101 and permit some of the ozone 110 generated to flow up the center of the dispersion cone 1200 (as further shown in the embodiment of FIG. 12B). An excess, a minority and/or a majority of the ozone 110 generated below the dispersion cone 1200 may overflow into two bubble paths 302, a bubble path 302A and a bubble path 302B. Although not shown in the present embodiment, each of the bubble path 302A and the bubble path 302B may be tapered and/or have a retaining lip to retain the bubbles in the bubble path 302 as the bubbles swirl around the dispersion cone 1200 (e.g., as illustrated in FIG. 13B). The bubbles of ozone 110 (and/or bubbles of hydrogen 112) may exit through the path terminus 305. The bubble path 302A leads to the path terminus 305A, and the bubble path 302B leads to the path terminus 305B. At each instance of the path terminus 305, bubbles of the ozone 110 are permitted to escape and travel upward in the water 102 to the surface of the water 102 and enter the voidspace 104, possibly creating some dissolved ozone during its rise.

Although not shown, there may be one or more dispersion holes 304 added along the bubble path 302A and/or the bubble path 302B. The number of bubble paths 302 may be increased to create additional channels which may have path termini 305 in various locations. The "pitch" (e.g., twist rate) and/or "depth" of the helical bubble paths 302, as such terms are used by analogy from screw threads as may be known in the mechanical arts, may be increased or decreased to increase bubble velocity, retention, contact time, and interaction with the water 102. Such twist rate may also be selected to ensure at least some elevation gain remains along the entirely of the bubble path 102 when the disperser 114 remains at an angle below the threshold angle. In one or more embodiments, the bubble paths 302 and/or the dispersion cone 1200 may be coated to reduce friction (e.g., a smooth electroplate metallic coating, a Teflon® coating). The bubble paths 302 may also be coated to increase friction. In one or more embodiments, the dispersion cone 1200 may comprise a relatively complex 3D printed shape.

FIG. 12B is a top-down view that illustrates another view of the embodiment of FIG. 12B further illustrating two instances of a path terminus 305, according to one or more embodiments. The embodiment of FIG. 12B illustrates the dispersion holes 304 providing direct release of bubbles of ozone 110 and/or hydrogen 112 to rise in the water level. Also shown are the path terminus 305A of the bubble path 302A and the path terminus 305B of the bubble path 302B.

FIG. 13A is another example of the disperser, according to one or more embodiments. Four instances of the bubble path 302 are illustrated, a bubble path 302A, a bubble path 302B, a bubble path 302C, and a bubble path 302D.

FIG. 13B is a second view of a cross section of the embodiment of FIG. 13A, according to one or more embodiments. Further illustrated in cross section is a retaining lip 306 helping to retain bubbles in the bubble path 302 including when the tank 101 may be positioned on an angle or slope.

The disperser 114 may be designed such that it continues to function if the tank 101 is positioned at an angle and/or set on a slope. For example, an instance of the tank 101 for use in a recreational vehicle may commonly be subject to slopes of fifteen percent while driving and five percent while parked. For example, the taper of the bubble paths may continue to retain bubbles in the disperser 114 at fifteen percent slope or five percent slope.

FIG. 14 illustrates an instance of an ozonation apparatus, referred to in the present embodiment as the ozonation apparatus 1400, that may be additively manufactured (e.g., three-dimensionally printed), for example including one or more integrated components within the tank 101 such as the bubble path 302 for the ozone 110 and the vent tubing 210 for hydrogen gas 112, according to one or more embodiments. The cylindrical tank 101 of FIG. 14 is shown as having a transparent shell for illustrative purposes such that internal components can be observed. FIG. 14 illustrates that additive manufacturing can be utilized to produce one or more of the components and/or devices of the present embodiments, including utilizing materials such as plastics, composites, ceramics, and/or metals. A number of additive manufacturing techniques may be utilized alone or in combination to produce one or more of the present embodiments, including utilizing, for example, stereolithography (SLA), selective laser sintering (SLS), fused deposition modeling (FDM), digital light process (DLP), multi jet fusion (MJF), PolyJet, direct metal laser sintering (DMLS, and electron beam melting (EBM).

In one or more embodiments, and the embodiment of FIG. 14, a tank 101 may be produced with integrated tubing, shunts, collectors, housings (e.g., for the ozone generator 103 and/or the electrode 105), and/or other components. FIG. 14 shows a schematic view illustrating a general configuration of several of such components (FIG. 14 omits scaffolding and/or supports that may be advantageous to include within an additive manufacturing process, and which one skilled in the art will know how to add for manufacturing purposes).

In one or more embodiments, and the embodiment of FIG. 14, two collectors may be stacked, a collector 301 for the ozone 110 generated at the anode 207 of the electrode 105, and a collector 1401 for the hydrogen 112 generated at the cathode 208 of the electrode 105. The anode 207 and the cathode 208 may be separated by the PEM membrane 206, or otherwise electrically coupled while still preventing mixture of the gases generated at each of the cathode 208 and the anode 207. The collector 301 may directly release some of the ozone 110 through holes in the collector 301 (shown but unlabeled), and may convey other portions of the ozone 110 to the bubble path 302. The collector 1401 may collect the hydrogen 112 and convey the hydrogen 112 to the vent tubing 210 (e.g., via the shunt 209).

In one or more embodiments, and as shown in FIG. 14, the bubble path 302 may be a rising helical coil embedded or otherwise connected to the interior surface of the tank 101. Ozone 110 bubbles may follow the bubble path 302, slowing the vertical rise of the bubbles and moving the bubbles to the edge of the tank 101, which may both increase contact time, increase dissolved ozone 110 concentration, and/or induce mixing of the water 102 in the tank 101. The bubble path 302 may also run in other patterns throughout the interior volume of the tank 101. The bubble oath 302 may optionally include one or more dispersion holes 304 for distributing ozone 110 bubbles at various points along the bubble path 302. The bubble path 302 may include a retaining lip 306, as shown and described in conjunction with the embodiment of FIG. 13B, including to permit continued channeling of ozone 110 bubbles during tilting of the tank 101. Although one bubble path 302 is shown, the ozonation apparatus 1400 may have multiple instances of bubbles paths 302.

In one or more embodiments, and the embodiment of FIG. 14, the shunt 209 is a ramp with edges leaving a collection zone gathering hydrogen 112 gas and/or bubbles. The vent tubing 210 may be a hollow tubing and/or column integrated into the tank 101, shown as a vertical tube in FIG. 14. The vent tubing 210 may deposit the hydrogen 112 into the voidspace 104, a vent 116, a pressure release 118, and/or a decomposition unit 120 (each of which are not shown in the embodiment of FIG. 14). However, in one or more other embodiments, a 3D printed apparatus does not need to include a means for individual hydrogen separation, conveyance, and/or decomposition.

In one or more embodiments, the volume of the voidspace 104 may be regulated to reduce available volume for the buildup of the evolved gas 108 (e.g., the ozone 110 and/or the hydrogen 112). For example, a volume of the water 102 in the tank 101 may be periodically sensed (e.g., by the volume sensor 510 of the control unit 500) and maintained at a set volume though the inflow of input water. Failure to maintain the volume of the voidspace 104 at an appropriate level may result in a warning generated for a user and/or inactivation of the ozone generator 103.

Although the present embodiments have been described with reference to specific example embodiments, it will be evident that various modifications and changes may be made to these embodiments without departing from the broader spirit and scope of the various embodiments. For example, the various devices, engines and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the control unit 500). Accordingly, the specification and drawings are to be regarded in an illustrative rather than a restrictive sense.

The structures in the figures such as the applications, engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, any logic flows depicted in the figures or discussed the text do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

I claim:

1. A method for treating water in a tank with ozone, the method comprising:
receiving an activation instruction from a control unit to treat a water in the tank,
   wherein the control unit comprises a processor and a computer readable memory, and
   wherein the computer readable memory comprises computer readable instructions that when executed generate the activation instruction;
determining utilizing the control unit a volume of the water in the tank,
   wherein the computer readable memory further comprises a volume detection routine:
determining utilizing the control unit a treatment duration for the water with the ozone based on the volume of the water in the tank,
   wherein the computer readable memory further comprises an ozone treatment application;
setting a timer of the control unit for generation of the ozone gas by an electrolytic ozone unit;
initiating by the control unit generation of at least one of dissolved ozone and ozone gas at least partially in the form of ozone bubbles utilizing the electrolytic ozone unit,
   wherein the electrolytic ozone unit comprises an electrode, and
   wherein the electrode comprises an anode producing the ozone and a cathode; and
inhibiting a vertical rise velocity of the ozone bubbles by deflecting the ozone bubbles rising from the electrolytic ozone unit horizontally along a bubble path prior to a completion of the vertical rise of the ozone bubbles within the water in the tank to increase an ozone concentration per unit of power of a power source.

2. The method of claim 1, further comprising:
detecting an angle of at least one of the tank and a disperser inhibiting the vertical rise velocity of the ozone bubbles and deflecting the ozone bubbles rising from the electrolytic ozone unit horizontally;
determining the angle of the at least one of the tank and the disperser exceeds a threshold value;
generating a notification that the angle of the at least one of the tank and the disperser exceeds the threshold value; and
deactivating the electrode by preventing a supply of the power from the power source to the electrode when determining the angle of at least one of the tank and the disperser exceeds the threshold value.

3. The method of claim 2, further comprising:
determining an inflow of a new water into the tank;
calculating a new volume of the water in the tank following the inflow of the new water into the tank;
recalculating the treatment duration based on the inflow of the new water into the tank; and
extending a remaining time of the timer to ensure effective treatment of the water.

4. The method of claim 2, further comprising:
determining an outflow of the water from the tank;
calculating a new volume of the water in the tank following the outflow of the water from the tank;
recalculating the duration based on the outflow of the water from the tank; and
shortening a remaining time of the timer to ensure effective treatment of the water.

5. The method of claim 3, further comprising:
channeling the ozone bubbles along one or more bubble paths rising in slope to increase contact time with the water; and
releasing the ozone bubbles to rise in the water from the one or more bubble paths at one or more dispersion holes.

6. The method of claim 5, further comprising:
applying an electrical current across a proton exchange membrane electrically coupling the anode and the cathode, the proton exchange membrane segregating production of the ozone at the anode and a hydrogen gas at the cathode;
shunting the hydrogen gas from the cathode of the electrode to a catalytic decomposition unit comprising a decomposition catalyst; and
catalytically decomposing the hydrogen gas.

7. The method of claim 6, further comprising:
determining a trigger event; and
generating the activation instruction to treat the water in the tank;
determining an electrolyte concentration in the water,
wherein the electrolyte concentration determined through detection of a conductivity of the water;
determining the electrolyte concentration is below a second threshold value;
deactivating the electrode by preventing a supply of power from the power source to the electrode when determining the determining the electrolyte concentration in the water is below the second threshold value;
generating a notification that the electrolyte concentration is below the second threshold value; and
dispensing an electrolyte into the water,
wherein the volume of the water in the tank is determined through measurement of at least one of a depth of the water in the tank and a weight of the water in the tank,
wherein the anode of the electrode comprising at least one of boron doped diamond and tin-nickel oxide, and
wherein the decomposition catalyst comprising platinum.

* * * * *